(12) United States Patent
Kurumaya

(10) Patent No.: US 10,367,975 B2
(45) Date of Patent: Jul. 30, 2019

(54) COLORIMETRIC CHART CREATING APPARATUS, COLORIMETRIC CHART CREATING METHOD, AND PROGRAM

(71) Applicant: KONICA MINOLTA, INC., Chiyoda-ku, Tokyo (JP)

(72) Inventor: Haruka Kurumaya, Niiza (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/915,432

(22) Filed: Mar. 8, 2018

(65) Prior Publication Data

US 2018/0288283 A1 Oct. 4, 2018

(30) Foreign Application Priority Data

Mar. 31, 2017 (JP) ................. 2017-070974

(51) Int. Cl.
| | |
|---|---|
| G06K 15/00 | (2006.01) |
| H04N 1/40 | (2006.01) |
| H04N 1/60 | (2006.01) |
| G06K 15/02 | (2006.01) |
| H04N 1/00 | (2006.01) |
| G01J 3/52 | (2006.01) |
| G06K 15/12 | (2006.01) |

(52) U.S. Cl.
CPC ............. *H04N 1/6033* (2013.01); *G01J 3/52* (2013.01); *G06K 15/027* (2013.01); *G06K 15/1878* (2013.01); *H04N 1/00005* (2013.01); *G06K 15/129* (2013.01)

(58) Field of Classification Search
CPC ..... H04N 1/6033; H04N 1/00005; G01J 3/52; G01J 3/46; G06K 15/027; G06K 15/1878; G06K 15/129
See application file for complete search history.

(56) References Cited

U.S. PATENT DOCUMENTS

| | | | | |
|---|---|---|---|---|
| 2012/0086961 | A1* | 4/2012 | Ikeda ................... | H04N 1/6033 358/1.9 |
| 2015/0168887 | A1* | 6/2015 | Sato ................... | G03G 15/2039 399/69 |
| 2016/0352972 | A1* | 12/2016 | Kobayashi ........... | H04N 1/6008 |

FOREIGN PATENT DOCUMENTS

JP 2016-158136 A 9/2016

* cited by examiner

*Primary Examiner* — Moustapha Diaby
(74) *Attorney, Agent, or Firm* — Buchanan Ingersoll & Rooney PC

(57) ABSTRACT

A colorimetric chart creating apparatus includes a hardware processor that: groups a plurality of patches having different colors and to be arrayed in a colorimetric chart such that patches having an overlapping error range of color reproducibility belong to a same group; determines an arrangement order of the plurality of patches such that an arrangement order of the groups expresses desired information; and creates print data of the colorimetric chart in which the plurality of patches is arrayed in the determined arrangement order.

13 Claims, 27 Drawing Sheets

ACQUIRE DATA OF MEASUREMENT CHART

| PRINT PATCH No | A | B | C | D | E | ... |
|---|---|---|---|---|---|---|
| L*a*b VALUE ON DATA | (34, −28, 26) | (24, 10, −33) | (37, 10, −40) | (34, 28, −42) | (61, 11, −43) | ... |
| | | | | | | ... |

CALCULATE VALUE OF ΔE FROM COLORIMETRIC VALUE OBTAINED BY READING

| PRINT PATCH No | A | B | C | D | E | ... |
|---|---|---|---|---|---|---|
| MEASURED VALUE (L*a*b VALUE) | (34, −28, 26) | (24, 10, −33) | (37, 10, −40) | (34, 28, −42) | (61, 11, −43) | ... |
| ΔE VALUE | 2.1 | 4.5 | 3.2 | 5.1 | 4.6 | ... |
| | | | | | | ... |

USER SET ΔE VALUE
IN ADVANCE

| PRINT PATCH No | A | B | C | D | E | ... |
|---|---|---|---|---|---|---|
| PRINT-SCHEDULED L*a*b | (34, −28, 26) | (24, 10, −33) | (37, 10, −40) | (34, 28, −42) | (61, 11, −43) | ... |
| ΔE VALUE | 4 | 4 | 4 | 4 | 4 | ... |
|  | ▨ | ▨ | ▨ | ▨ | ▨ | ... |

FIG. 6
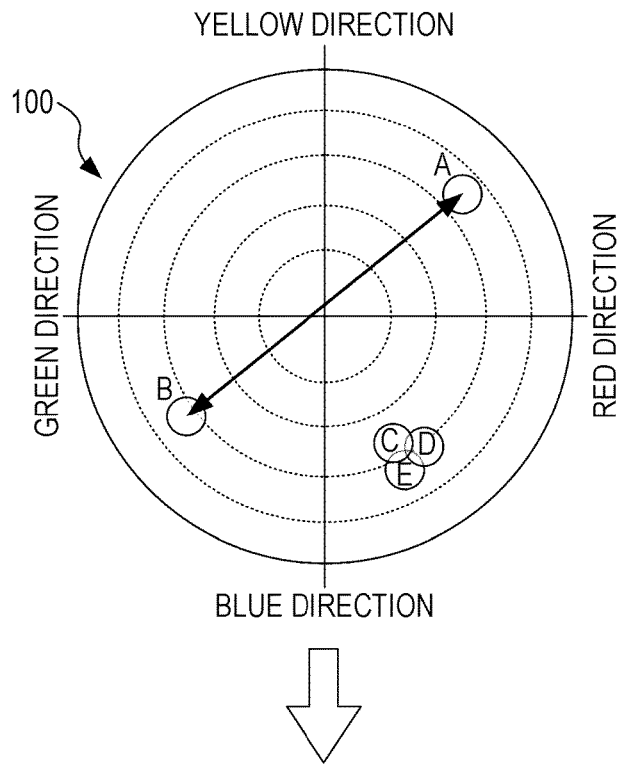
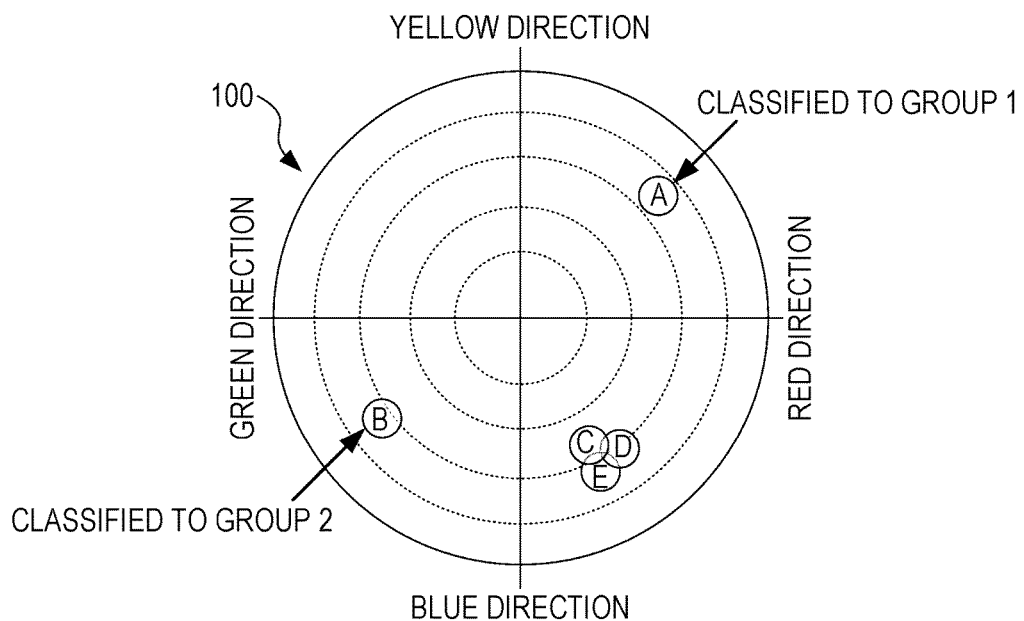

FIG. 7
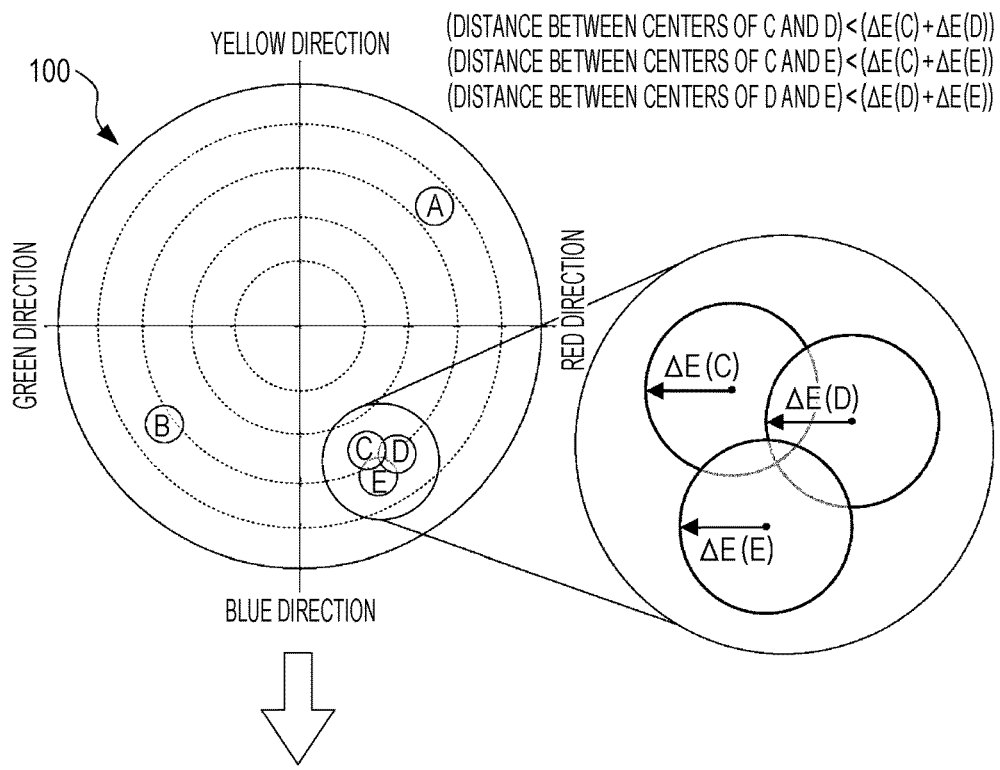
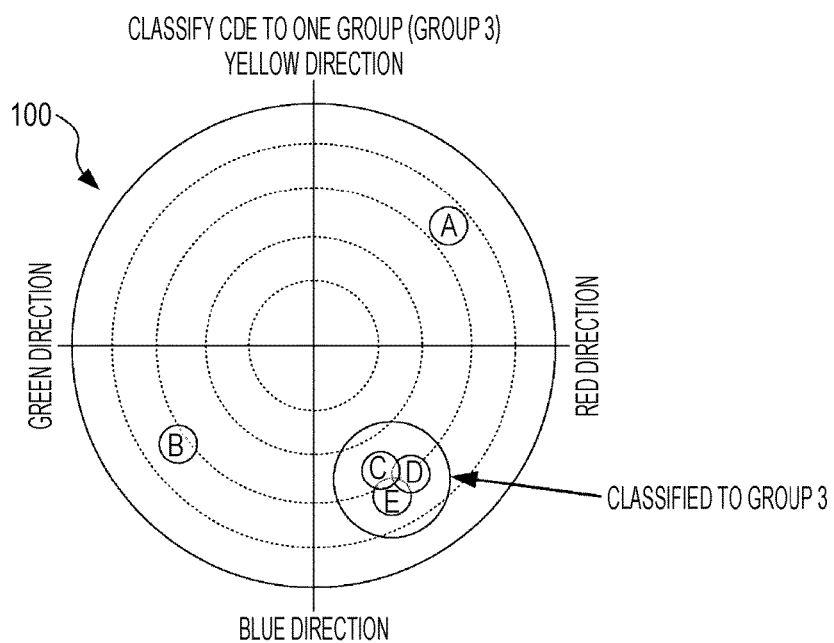

FIG. 9
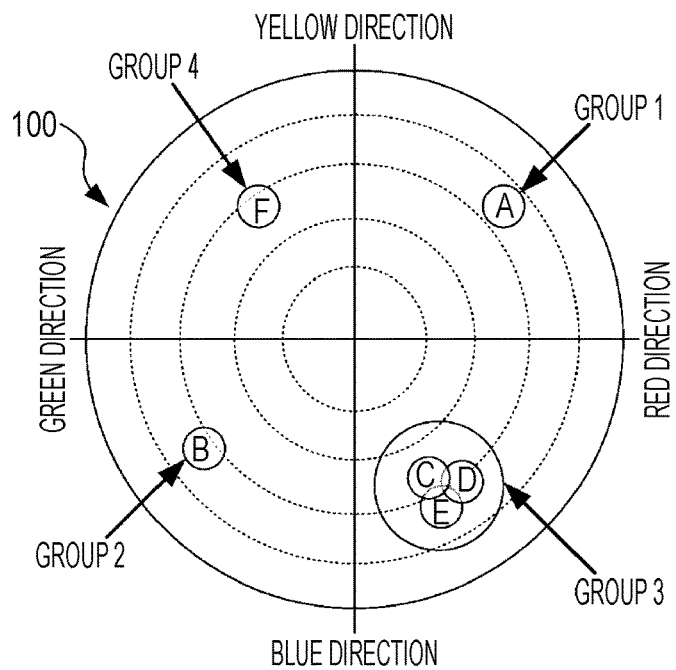
EXPRESS ARRANGEMENT OF TWO PATCHES FROM LEFT IN BINARY NUMBERS AND BINARY NUMBERS ARE USED AS IDENTIFIER OF DEVICE
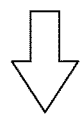

FIG. 13
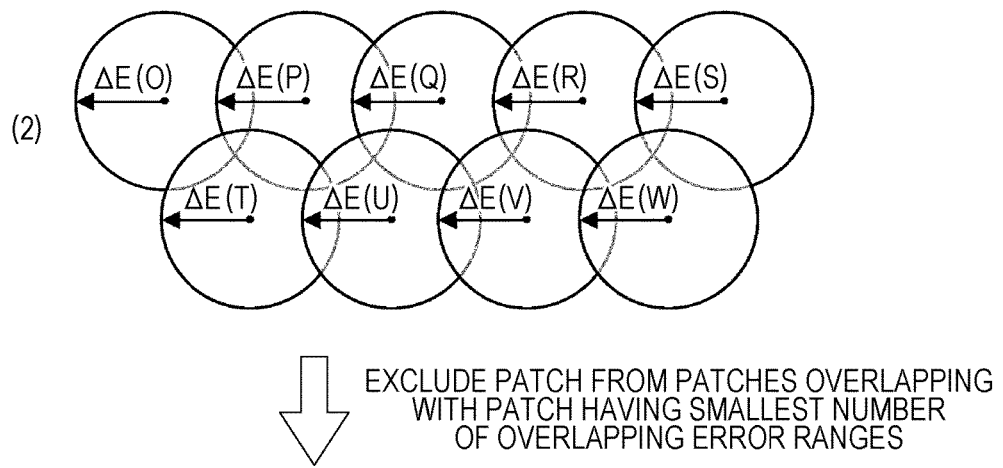
EXCLUDE PATCH FROM PATCHES OVERLAPPING WITH PATCH HAVING SMALLEST NUMBER OF OVERLAPPING ERROR RANGES
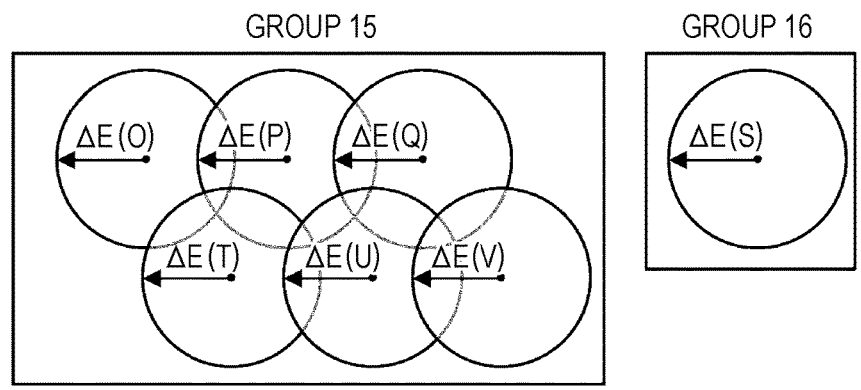
EXCLUDE PATCH FROM PATCHES OVERLAPPING WITH PATCH HAVING SMALLEST NUMBER OF OVERLAPPING ERROR RANGES
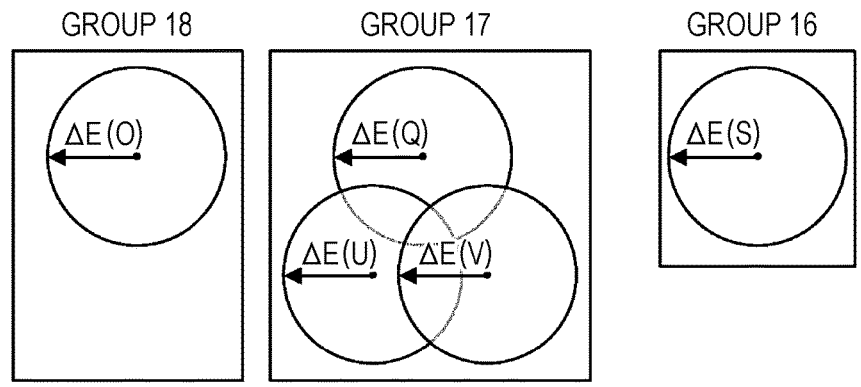

FIG. 14
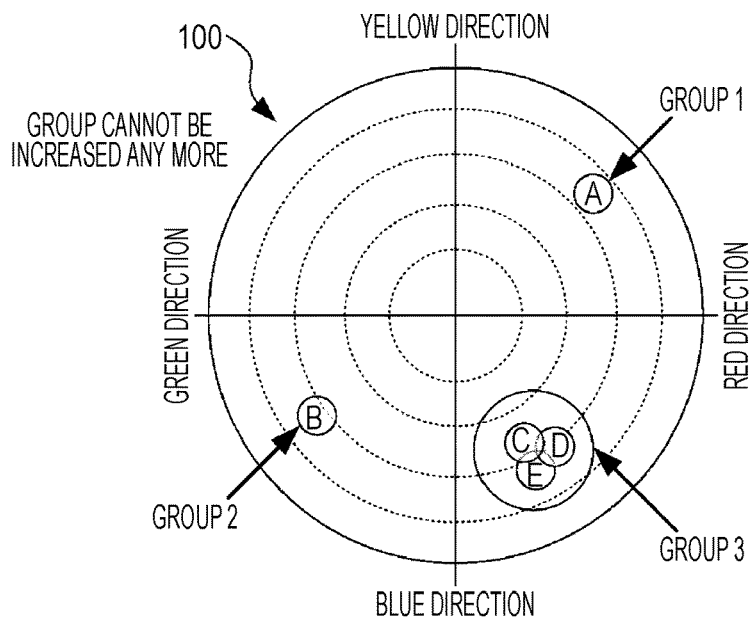
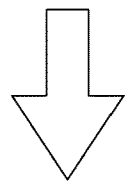
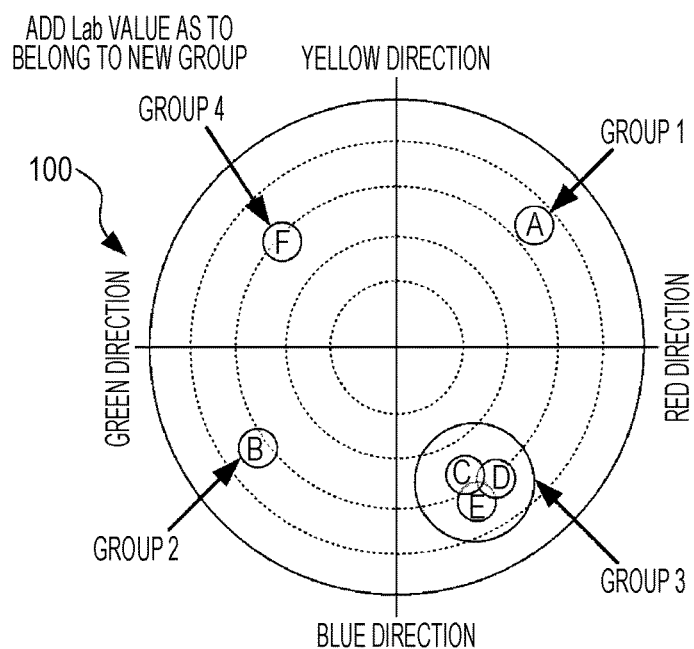

FIG. 17
| PRINT PATCH No | A | B | C | D | E | ... |
|---|---|---|---|---|---|---|
| MEASURED VALUE L*a*b VALUE | (80, 24, 21) | (98, −48, −14) | (48, 30, −38) | (77, 10, −46) | (62, 12, −42) | ... |
|  |  |  |  |  |  | ... |
| GROUP | G1 | G2 | G3 | G3 | G3 |  |
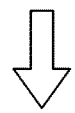
SPECIFY DEVICE MATCHED WITH ARRANGEMENT OF GROUPS
110
| PRINT PATCH No | ARRANGEMENT OF PATCHES (GROUP) | | | | | PRINTING DEVICE |
|---|---|---|---|---|---|---|
|  | A | B | C | D | E |  |
| PATTERN 1 | G1 | G2 | G3 | G3 | G3 | DEVICE A |
| PATTERN 2 | G1 | G3 | G2 | G3 | G3 | DEVICE B |
| PATTERN 3 | G1 | G3 | G3 | G2 | G3 | DEVICE C |
| ... | ... | ... | ... | ... | ... |  |
40
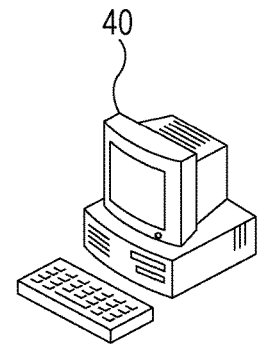
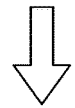
PC TERMINAL CREATES CORRECTION DATA ON THE BASIS OF COLORIMETRICALLY MEASURED VALUES

FIG. 27

CONTENT OF CHART WHEN PRINTING BY DEVICE #1

| PRINT PATCH No | A | B | C | D | E | F | G | H | I |
|---|---|---|---|---|---|---|---|---|---|
| PRINT-SCHEDULED L*a*b | (34, −28, 26) | (24, 10, −33) | (37, 10, −40) | (34, 28, −42) | (43, 8, 55) | (63, 8, 45) | (80, −25, 38) | (96, −12, 20) | (88, −12, 55) |

INDICATES (DEVICE #1)     INDICATES PRINT DATE AND TIME (2015/12/20, 14:40)

RECOGNITION CONTENT FROM COLORIMETRY RESULT

B+UNEVENNESS RECOGNIZED AS C    C+UNEVENNESS RECOGNIZED AS B

| RECOGNIZED PATCH No | A | C | B | D | E | F | G | H | I |
|---|---|---|---|---|---|---|---|---|---|
| COLORIMETRY RESULT L*a*b | (32, −30, 24) | (24, 10, −37) | (37, 10, −35) | (37, 31, −39) | (44, 9, 56) | (62, 7, 44) | (82, −23, 36) | (94, −10, 18) | (91, −15, 52) |

RECOGNIZED AS INDICATING (DEVICE #2)     RECOGNIZED AS INDICATING PRINT DATE AND TIME (2015/12/20, 14:40)

COLORIMETRIC CHART CREATING APPARATUS, COLORIMETRIC CHART CREATING METHOD, AND PROGRAM

The entire disclosure of Japanese patent Application No. 2017-070974, filed on Mar. 31, 2017, is incorporated herein by reference in its entirety.

BACKGROUND

Technological Field

The present invention relates to a colorimetric chart creating apparatus that creates a colorimetric chart that expresses desired information by an arrangement order of patches, and a colorimetric chart method, and a program.

Description of the Related Art

When a printing device performs a print output, deviation (color deviation) in color reproducibility is caused in a printed matter due to various causes such as device characteristics and change over time even if the printing device outputs a desired color on data.

Therefore, printing a colorimetric chart at appropriate timing and confirming whether the color deviation falls within an allowable range, or printing the colorimetric chart, calculating correction data for causing a color of an image formed on a sheet of paper to fall within an allowable range from a measurement result of a color obtained by reading the colorimetric chart with a colorimeter, and correcting an image signal value using the correction data, in order to correct the color deviation, are performed.

By the way, when there is a plurality of printing devices, colorimetry needs to be performed under correct recognition of which printing device the colorimetric chart has been output from. However, since the colorimetric charts output from the respective printing devices have the same pattern, visually identifying the colorimetric charts is difficult and a user may get a wrong colorimetric chart to be checked. Further, there is a problem that, in a case where an old colorimetric chart is read with the colorimeter, the current printing device may erroneously grasp the color reproducibility.

Typically, as a countermeasure to the above problem, directly printing information of the printing device that has printed the colorimetric chart, print date and time, and the like on a margin of the sheet of paper on which the colorimetric chart has been printed, or printing a barcode indicating the information is conceivable.

However, considering a possibility that the user may misread letters in the case of printing letters and a fact that a special reader is separately required in the case of a barcode, it is desirable to determine the information indicating the printing device that has printed the colorimetric chart as an object to be read, the print date and time, and the like, from read data of the colorimeter.

For example, JP 2016-158136 A discloses a method of expressing information of a printing device, print date of time, and the like by an arrangement order of patches constituting a colorimetric chart, and acquiring the information from a colorimetric value read with a colorimeter.

In the method disclosed in JP 2016-158136 A, the arrangement order of the patches to be arrayed in the colorimetric chart is changed according to information to be embedded. Therefore, a patch in which color is arrayed in each place is determined from the colorimetric value read and obtained by the colorimeter. However, if a plurality of patches in close colors in which error ranges of color reproducibility overlap with each other is used, misrecognition of a patch occurs due to color deviation in a case of reading the patches with the colorimeter, and the information of the printing device, print date and time, and the like may not be able to be correctly read. Specific examples will be described below.

FIG. 25 illustrates an example of expressing information of a printing device, print date and time, and the like by the method disclosed in JP 2016-158136 A. In FIG. 25, the printing device and the print date and time are expressed by the arrangement order of patches of eight different colors A to I. The arrangement order of the three patches from the left expresses an identifier of the printing device, and the arrangement order of the fourth and subsequent patches expresses the print date and time.

In FIG. 25, there are patterns of the arrangement order of (ABCDEFGHI) and (ACBDEFGHI), the case of the left three patches ABC indicates that the printing has been performed by a device 1, and the case of the left three patches ACB indicates that the printing has been performed by a device 2. Furthermore, the order of patches DEFGHI from the fourth patch from the left to the right end patch indicates that the printing date and time is at 14:40 on Dec. 20, 2015.

FIG. 26 is a diagram illustrating distribution of the colors indicated by the patches A to I in FIG. 25 on an Lab color space 100 in a simplified manner. In FIG. 26, the center of a circle surrounding an alphabet representing each patch indicates coordinates indicating an original color intended to be printed with the patch. The range of the circle is a color range (hereinafter referred to as error range) that can be taken by the colorimetric value when printing is performed and a print result of the printing is colorimetrically measured.

In FIGS. 26, B and C partially overlap with each other in the error ranges. Therefore, in a case where the color indicated by the colorimetric value obtained through the colorimetry is a color falling within the overlapping range, the colorimeter may misrecognize which of the B and C patches has been printed.

For example, in FIG. 26, coordinates B1 located in an end of the error range of B and in a position overlapping with the error range of C is closer to the B coordinates (the center of the circle of B) than to the coordinates C (the center of the circle of C). Therefore, in a case where B1 appears as a print result at the time of printing B, B1 may be misrecognized as the patch C at the time of colorimetry. Further, coordinates C1 located in an end of the error range of C and in a position overlapping with the error range of B is closer to the C coordinates than to the coordinates B. Therefore, in a case where C1 appears as a print result at the time of printing C, C1 may be misrecognized as the patch B at the time of colorimetry.

FIG. 27 illustrates arrangement of patches and Lab values of the patches on data at the time of printing, and arrangement of the patches and Lab values of the patches recognized from a colorimetry result.

On the data, the patches of the colorimetric chart are in the arrangement order of ABCDEFGHI, and indicate that printing has been performed by the device 1 at 14:40 on Dec. 20, 2015, similarly to FIG. 25.

However, the order of the patches recognized from the colorimetry result obtained by colorimetrically measuring the print result is an arrangement order of ACBDEFGHI, and the patch B in which the color deviation has occurred is misrecognized as the patch C, and the patch C in which the color deviation has occurred is misrecognized as the patch B. Due to the misrecognition of the arrangement of the patches, it is misrecognized that the printing has been performed by the device 2 at 14:40 on Dec. 20, 2015.

Therefore, measures to prevent misrecognition due to such color deviation are desired.

SUMMARY

The present invention solves the above-described problems, and an object thereof is to provide a colorimetric chart creating apparatus capable of creating a colorimetric chart correctly expressing information even when misrecognition of patches occurs at the time of colorimetry due to an error in color reproducibility when expressing information in an arrangement order of patches in various colors, a colorimetric chart creating method, and a program.

To achieve the abovementioned object, according to an aspect of the present invention, a colorimetric chart creating apparatus reflecting one aspect of the present invention comprises a hardware processor that:

groups a plurality of patches having different colors and to be arrayed in a colorimetric chart such that patches having an overlapping error range of color reproducibility belong to a same group;

determines an arrangement order of the plurality of patches such that an arrangement order of the groups expresses desired information; and creates print data of the colorimetric chart in which the plurality of patches is arrayed in the determined arrangement order.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 6 is a diagram illustrating a state of determining whether two separate patches belong to the same group;

FIG. 7 is a diagram illustrating a state of determining whether three gathered patches belong to the same group;

FIG. 9 is a diagram illustrating an example of a case of expressing binary numbers by a group to which two patches belong, and using the binary numbers as an identifier of a printing device;

FIG. 13 is a diagram illustrating an example of excluding a patch having a largest number of overlapping error ranges from among patches overlapping with a patch having a smallest number of overlapping error ranges, and subdividing the group, which is a different example from FIG. 12;

FIG. 14 is a diagram illustrating a state of adding a patch to increase the number of groups;

FIG. 17 is a diagram illustrating a state of specifying a device that has printed a colorimetrically measured colorimetric chart from the arrangement order of groups;

FIG. 27 is a diagram illustrating an example of a case where an arrangement order of patches is misrecognized due to occurrence of color deviation.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
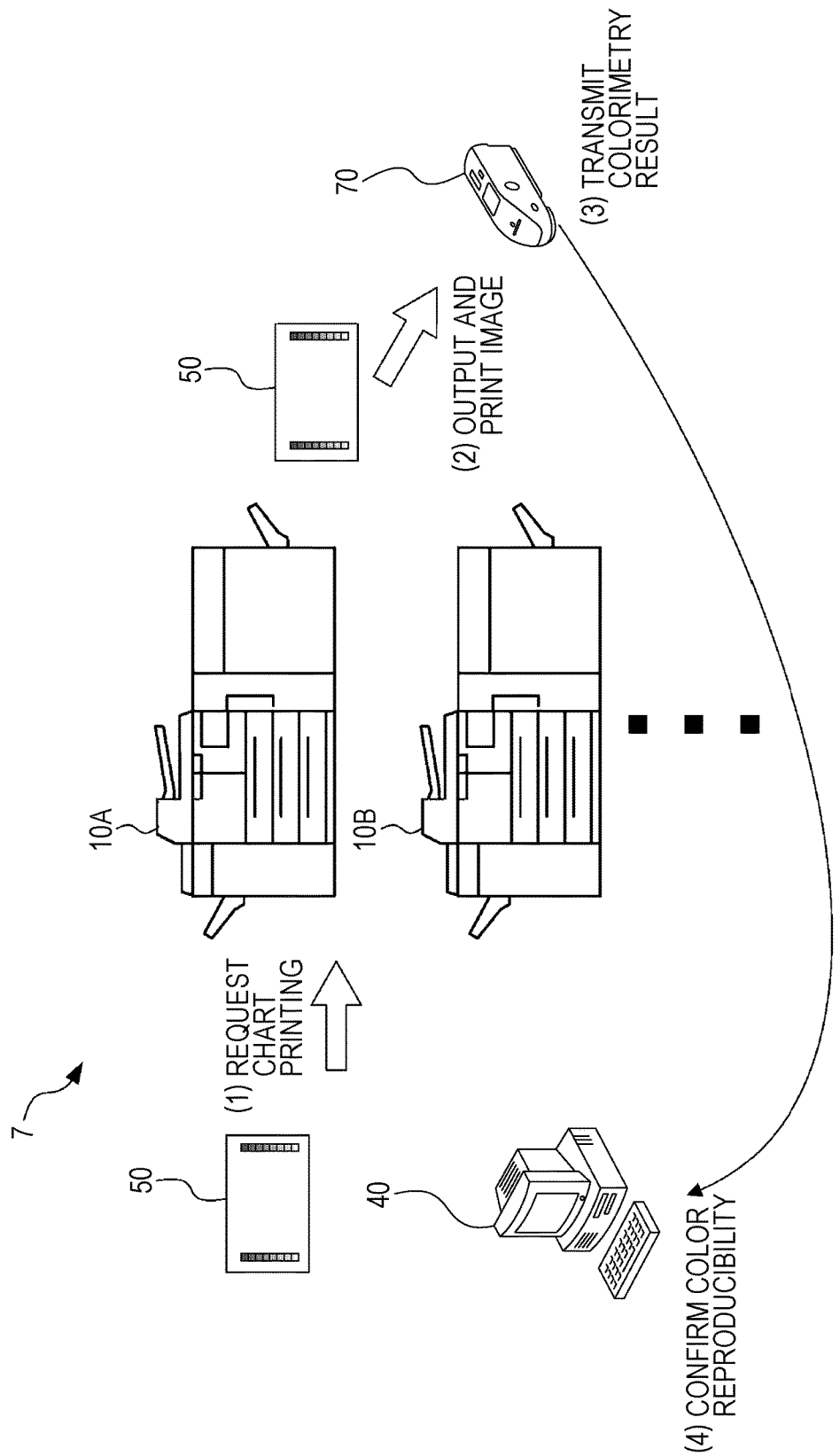
FIG. 1 is an explanatory diagram illustrating a color reproducibility confirmation system including an image forming device according to an embodiment of the present invention.

FIG. 1 illustrates a reproducibility confirming system 7 including a PC terminal 40 that plays a role of as a colorimetric chart creating apparatus of the present invention, two image forming devices 10 (10A and 10B), and a colorimeter 70. In the reproducibility confirming system 7, the PC terminal 40 is communicatively connected with other devices in a wired or wireless manner. In a case of collectively referring to or referring to any one of the image forming devices 10A and 10B, the image forming devices 10A and 10B or the image forming device 10A or 10B is written as image forming device 10.

The PC terminal 40 is a so-called desktop PC terminal including a display unit and an operation unit such as a mouse, a keyboard, and display. The PC terminal 40 can transmit a print job for viewing and editing a document file and an image file, and for printing content of the data files to the image forming device 10. In an embodiment of the present invention, the PC terminal 40 transmits print data of a colorimetric chart 50 configured from an arrangement of a plurality of patches to the image forming device 10, and causes the image forming device 10 to form an image (corresponding to (1) in FIG. 1).

The image forming device 10 is a so-called multi-function peripheral having a function to execute jobs such as a copy job for optically reading a document and printing a duplicated image on a recording sheet, a scan job for saving image data of a read document as a file and sending the image data to an external device, and a print job for printing and outputting an image relating to data sent from the PC terminal 40 on a recording sheet. In the embodiment of the present invention, the colorimetric chart 50 is printed and output on the basis of the print data transmitted from the PC terminal 40 (corresponding to (2) in FIG. 1).

The colorimeter 70 colorimetrically measures the colorimetric chart 50 printed and output by the image forming device 10, and transmits a measured value obtained through the colorimetry to the PC terminal 40 (corresponding to (3) in FIG. 1).

The PC terminal 40 receives the measured value, which is obtained by colorimetrically measuring the colorimetric chart 50 printed by the image forming device 10, from the colorimeter 70. Thereafter, on the PC terminal 40, the received measured value is compared with each color in the colorimetric chart 50 on data, and whether the generated color deviation falls within an allowable range is checked.

By the way, there is a method of expressing information by an arrangement order of patches arrayed in the colorimetric chart 50, as a method of embedding information such as an ID of a device that has printed the colorimetric chart and print date and time in the colorimetric chart 50. However, for example, if a patch A and a patch B in close colors are used for information expression, a recognition error such as misrecognizing the patch A as the patch B due to color deviation may occur, and wrong information may be obtained. Therefore, in the embodiment of the present invention, the PC terminal 40 groups the patches constituting the colorimetric chart 50 such that patches having an overlapping possible error range of color deviation belong to the same group. Then, the PC terminal 40 determines the arrangement order of the patches constituting the colorimetric chart 50 such that an arrangement order of groups to which the patches belong expresses desired information such as the device information that has performed printing, the print date and time, and print setting content, and creates the colorimetric chart 50 in which the patches are arrayed in the determined arrangement order.

The PC terminal 40 recognizes the arrangement order of the patches from the measured values of the colors of the colorimetric chart 50 received from the colorimeter 70, and recognizes the information such as the device that has printed and outputted the colorimetric chart 50, the print date and time, and the like, which is expressed by the arrangement order of the groups, on the basis of the arrangement order of the groups to which the patches belong.

Thereby, which one of the plurality of image forming devices 10 has printed the colorimetric chart 50 can be recognized. The patches in colors that are easily misrecognized due to occurrence of color unevenness at the time of colorimetry are grouped, and the information is expressed by the arrangement order of the groups. Therefore, even when the patches are misrecognized due to occurrence of the color deviation, the information expressed by the arrangement order of the groups to which the patches belong is the same, and the information can be accurately recognized even if the color deviation occurs. For example, in a case where the patch A and the patch B are in a relationship of occurrence of misrecognition due to close colors, the patch A and the patch B are grouped into the same group, and a value G1 is associated with both the patch A and the patch B. The value corresponding to the patch is G1 even when either the patch A or the patch B is read at the time of colorimetry. Therefore, even if the patch A is misrecognized as the patch B, the value recognized from the patch is not misrecognized.

Figure 2:
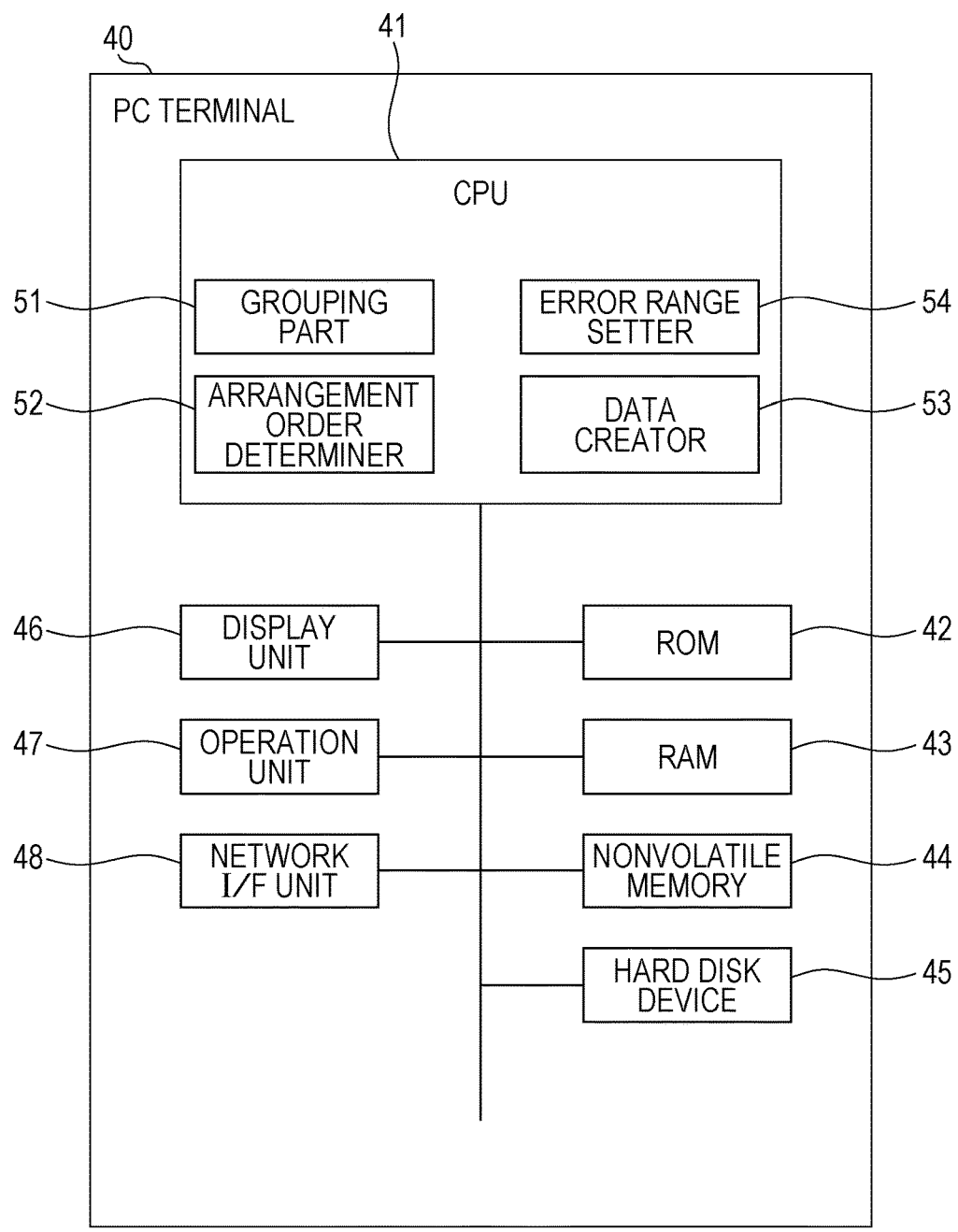
FIG. 2 is a block diagram illustrating a schematic configuration of an image forming device according to an embodiment of the present invention.

FIG. 2 illustrates a schematic configuration of the PC terminal 40. The PC terminal 40 includes a central processing unit (CPU) 41 that controls an operation of the PC terminal 40, a read only memory (ROM) 42 connected with the CPU 41, a random access memory (RAM) 43, a nonvolatile memory 44, a hard disk device 45, a display unit 46, an operation unit 47, and a network I/F unit 48.

The CPU 41 is based on an operating system (OS) program, and middleware, an application program, and the like are executed thereon. Various programs are stored in the ROM 42, and when the CPU 41 executes processing according to the programs, functions of the PC terminal 40 are realized. The RAM 43 is used as a work memory for temporarily storing various data and an image memory for storing image data when the CPU 41 executes the programs.

In the embodiment of the present invention, the CPU 41 plays roles as a grouping part 51, an arrangement order determiner 52, a data creator 53, and an error range setter 54.

The grouping part 51 plays a role of grouping a plurality of patches having different colors to be arrayed in the colorimetric chart 50 such that patches having an overlapping possible range of color deviation (error range) belong to the same group. Further, the grouping part 51 increases the number of groups when the number of groups is insufficient. An increase method will be described below.

The arrangement order determiner 52 plays a role of determining an arrangement order of a plurality of patches described above such that desired information is expressed by the arrangement order of the groups to which the patches belong.

The data creator 53 plays a role of creating print data of the colorimetric chart 50 in which the plurality of patches is arrayed in the arrangement order determined by the arrangement order determiner 52.

The error range setter 54 plays a role of receiving setting of an error range from a user or setting the error range on the basis of colorimetric data obtained by measuring the colorimetric chart 50 with the colorimeter 70.

The nonvolatile memory 44 is a rewritable memory (flash memory) that can store data even when a power supply is turned off. The nonvolatile memory 44 stores device-specific information and various types of setting information. The hard disk device 45 is a large-capacity nonvolatile storage device, and stores an OS program, various application programs, print data, image data, and the like. In the embodiment of the present invention, data of the patches constituting the colorimetric chart 50, information of the groups to which the patches belong, information expressed by the arrangement order of the groups, a colorimetric history that is a history of measured values obtained by colorimetrically measuring the colorimetric chart 50 printed in the past, and the like are stored.

The display unit 46 is configured from a liquid crystal display (LCD) and the like, and functions to display content regarding various operations and settings. The operation unit 47 is configured from a mouse, a keyboard, and the like, and functions to receive an operation from the user.

The network I/F unit 48 communicates with other external devices and the like connected via a network such as a LAN.

The colorimeter 70 functions to colorimetrically measuring the color of the colorimetric chart 50 set in the user's own device by the user. Here, the colorimeter 70 reads emitted light from red, green, and blue light emitting diode (LED) light sources with a sensor, and converts a voltage of the sensor (photodiode) into an Lab color system. This data is calibrated on the basis of a correlation with the colorimeter.

Next, the range of color deviation (error range) that may occur in each patch when the colorimetric chart 50 is printed and colorimetrically measured will be described. In the embodiment of the present invention, when an Lab value on data of one patch is mapped in the Lab color space 100, a range of a sphere centered at coordinates of the patch and having a radius ΔE is treated as the range of color (error range) that may occur at the time of occurrence of color deviation.

Figure 3:
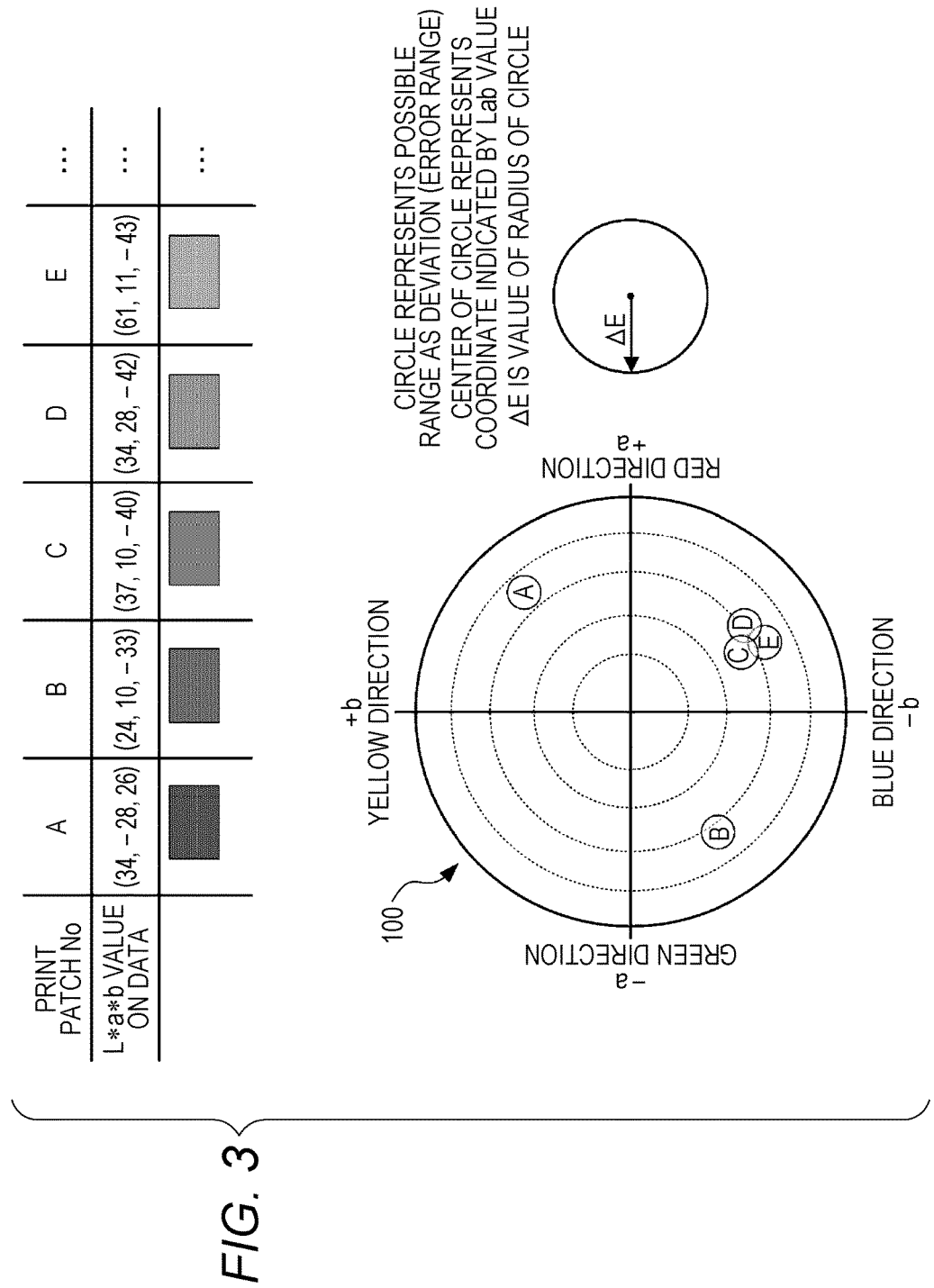
FIG. 3 is an explanatory diagram illustrating distribution of patches constituting a colorimetric chart on an Lab color space on data.

FIG. 3 illustrates patches A to E, and distribution of the patches and error ranges of the patches in a case where Lab values on data of the patches A to E are mapped in the Lab color space 100.

In FIG. 3, the center of a circle surrounding an alphabet representing each patch indicates coordinates corresponding to the Lab value on data of the patch. Then, the range of the circle is the error range.

In the embodiment of the present invention, the value of the radius ΔE of the error range is determined on the basis of the difference between the measured value and the Lab value on data. Alternatively, the value of the radius ΔE may be manually set by a user. The error range differs for each patch color. In the case of manual setting, all the patches may be set to have the same error range.

Figure 4:
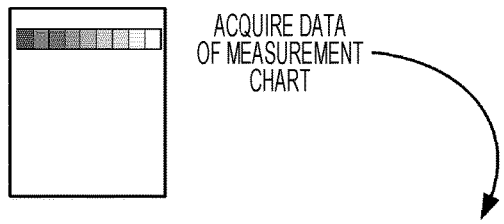
FIG. 4 is a diagram illustrating a state of comparing a measured value obtained by reading a printed colorimetric chart with a color value on data, and determining an error range (ΔE) of each patch.

FIG. 4 illustrates a state of determining the value of ΔE on the basis of the difference between the Lab value on data and the measured value, using the patches A to E in FIG. 3 as an example. First, when the PC terminal 40 inputs a print job of the colorimetric chart 50 to the image forming device 10, the image forming device 10 prints out the colorimetric chart 50.

The colorimeter 70 measures the printed colorimetric chart 50, and transmits the measured value of the Lab value of each patch to the PC terminal 40.

The PC terminal 40 determines the value of ΔE of the error range of each patch on the basis of a distance between coordinates indicated by the above measured value on the Lab color space 100 and coordinates indicated by the Lab value on data. For example, the PC terminal 40 sets, as ΔE, a value obtained by adding a predetermined value to the distance between the coordinates of the Lab value on data and the coordinates indicated by the Lab value of the measured value.

Note that the PC terminal 40 stores the measured value received from the colorimeter 70 in association with the Lab value on data as colorimetric history in a hard disk device 15. The error range ΔE may be calculated on the basis of the history of the past measured value and the Lab value by reference to the colorimetric history without printing the colorimetric chart 50 every time the value of ΔE is determined. For example, the error range ΔE may be determined by averaging the distances between the coordinates indicated by the measured values and the coordinates indicated by the Lab values on data.

Figure 5:
FIG. 5 is a diagram illustrating a state in which a user determines the error range (ΔE) of each patch.

FIG. 5 illustrates a state in which a user manually sets the value of ΔE, using the patches A to E in FIG. 3 as an example. FIG. 5 illustrates an example of setting a common value to ΔE regarding all the patches constituting the colorimetric chart 50. However, different values of ΔE may be set for each patch.

When the value of ΔE is determined (or set), the PC terminal 40 groups the patches constituting the colorimetric chart 50 such that patches having overlapping error ranges belong to the same group.

Next, a method of performing grouping will be described. FIGS. 6 and 7 illustrate a state of grouping the patches A to E in FIG. 3. In grouping, the PC terminal 40 determines whether two patches belong to the same group for each combination of two patches. FIG. 6 illustrates a state of determining whether the patch A and the patch B belong to the same group.

First, on the Lab color space 100, a distance (referred to as distance AB) between the coordinates indicated by the Lab value of the patch A and the coordinates indicated by the Lab value of the patch B is calculated.

Next, the distance AB is compared with a total of the value (ΔE(A)) of ΔE of the patch A and the value (ΔE(B)) of ΔE of the patch B.

In FIG. 6, "the distance AB>(ΔE(A)+ΔE(B))" is established, and thus it is determined that the error ranges of the patch A and the patch B do not overlap, and the patch A and the patch B are determined to belong to different groups.

In FIG. 6, the image forming device 10 groups the patch A into a group 1 and the patch B into a group 2 after confirming that the error ranges of the patch A and the patch B do not overlap with the error ranges of other patches (the patches C to E) by the above-described method.

FIG. 7 illustrates a state of determining whether the patch C, the patch D, and the patch E belong to the same group.

First, as in FIG. 6, a distance (distance CD) between the patch C and the patch D, a distance (distance CE) between the patch C and the patch E, a distance (distance DE) between the patch D and the patch E are calculated on the Lab color space 100.

Next, a total of the values (ΔE(C) and ΔE(D)) of ΔE of the patch C and the patch D, a total of the values (ΔE(C) and ΔE(E)) of ΔE of the patch C and the patch E, and a total of the values (ΔE(D) and ΔE(E)) of ΔE of the patch D and the patch E are calculated.

In FIG. 7, "the distance CD<(ΔE(C)+ΔE(D))" is established, and thus the image forming device 10 determines that the error ranges of the patch C and the patch D overlap and determines that the patch C and the patch D are grouped to belong to the same group.

Further, both "the distance CE<(ΔE(C)+ΔE(E))" and "the distance DE<(ΔE(D)+ΔE(E))" are satisfied, and thus the image forming device 10 determines that the error ranges of the patch C and the patch E, and the error ranges of the patch D and the patch E overlap, and therefore determines that the patch C and the patch E, and the patch D and the patch E are grouped into the same groups.

In this way, in FIG. 7, the patch C, the patch D, and the patch E are grouped to belong to the same group. In FIG. 7, the patch C, the patch D, and the patch E are grouped into a group 3.

Figure 8:
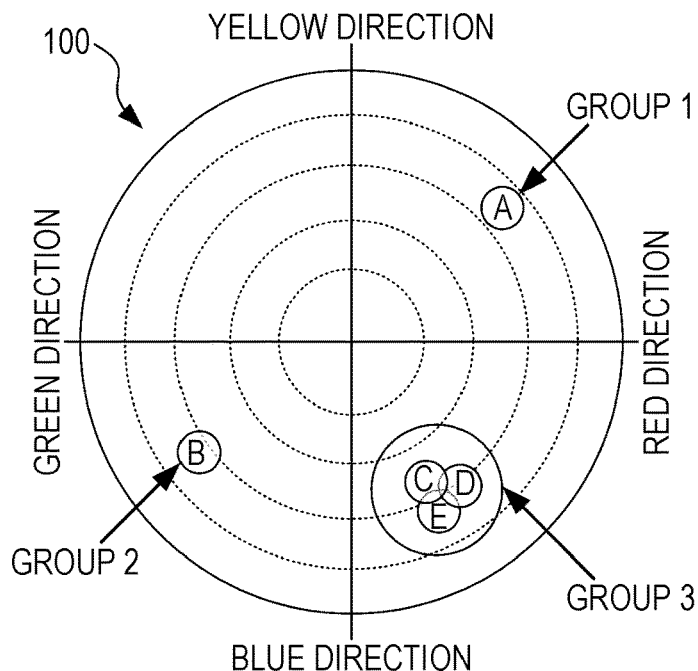
FIG. 8 is a diagram illustrating a state of expressing predetermined information by an arrangement order of groups caused by grouping.

Next, a method of expressing desired information such as device information by the arrangement order of groups will be described. FIG. 8 is a diagram illustrating a state of expressing predetermined information by an arrangement order of three groups caused by grouping in FIGS. 6 and 7. Hereinafter, a group (X) is also written as G(X).

For example, in a case of expressing information regarding one item, using all of the five patches A to E, there are the patch of G1×1, the patch of G2×1, and the patch of G3×3. Therefore, the number of the arrangement orders of groups by arranging the five patches is 5×4=20, and twenty types of expressions are possible for the item.

FIG. 8 illustrates an example of expressing identifiers of three image forming devices 10 (a device 1 to a device 3 in FIG. 8) by arrangements of five patches, and the device 1 is expressed by an arrangement order of "G1→G2→G3→G3→G3", the device 2 is expressed by an arrangement order of "G1→G3→G2→G3→G3" and the device 3 is expressed by an arrangement order of "G1→G3→G3→G2→G3".

Note that the method of expressing information is not limited thereto. For example, the arrangement of the groups may be expressed in binary numbers and the information may be expressed by the binary numbers, rather than using the arrangement order of the groups as it is.

FIG. 9 illustrates an example of expressing identifiers of a plurality of image forming devices 10 (a device 1 to a device 4 in FIG. 9) in binary numbers when there are four groups (groups 1 to 4). In FIG. 9, the identifiers of the devices 1 to 4 are expressed by 00, 01, 10, and 11 respectively representing the arrangements of groups G1→G4, G1→G3, G2→G1, and G1→G2.

There are cases where the number of pieces of information expressible by the arrangement orders of groups caused by grouping is less than the number of pieces of information to be expressed. For example, in a case where the number of pieces of information expressible by the arrangement orders of groups is twenty, all of thirty or more pieces of information cannot be expressed. Therefore, when the number of pieces of expressible information is less than the number of pieces of information to be expressed, the image forming device 10 increases the number of groups to increase the number of pieces of expressible information.

In the embodiment of the present invention, the image forming device 10 increases the number of groups by either a method of subdividing an existing group or a method of adding a new group by adding a patch. Hereinafter, both the methods will be described with specific examples.

Figure 10:
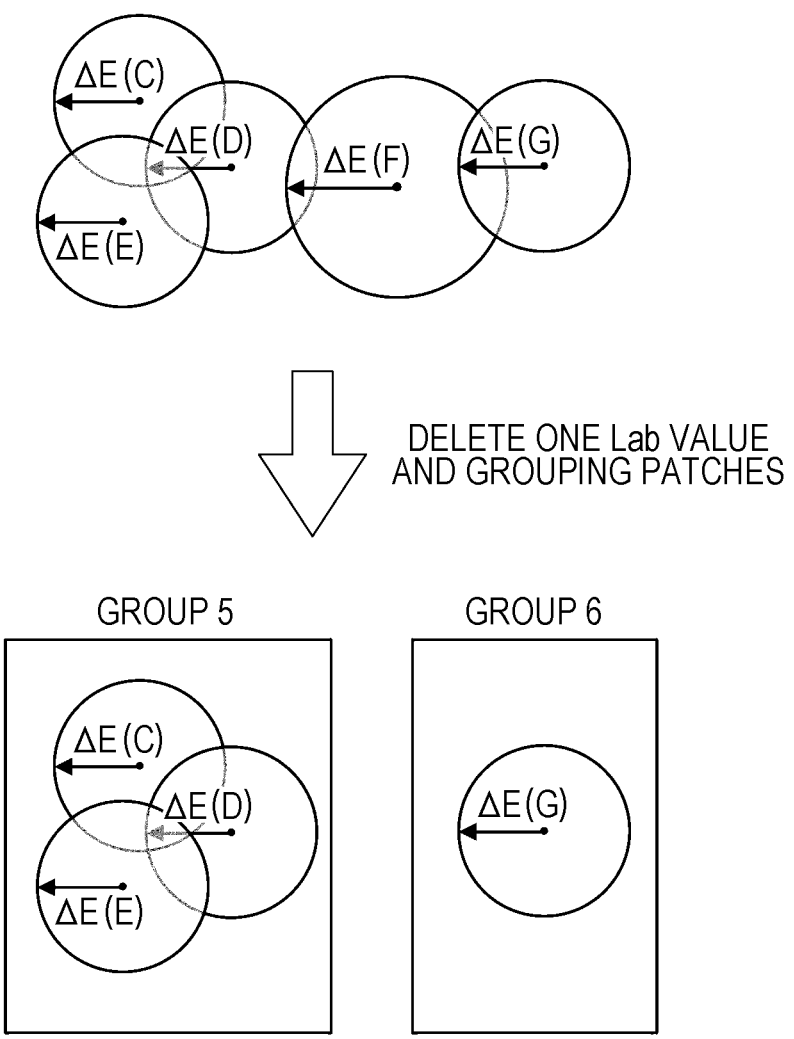
FIG. 10 is a diagram illustrating a state of excluding a patch in the center of a group and subdividing the group.

First, the case of subdividing an existing group will be described. FIG. 10 illustrates a state of dividing five patches (patches C to G) into two groups when the five patches belong to one group.

In FIG. 10, the error ranges of the patch C, the patch D, and the patch E overlap with one another. Further, the error range of the patch F overlaps with the error range of the patch D, and the error range of the patch G overlaps with the error range of the patch F in a linking manner.

Here, when the patch F (the Lab value of the patch F) is excluded not to belong to any group, the error range of the patch G do not overlap with the error ranges of other patches. Therefore, the patches C to D, and the patch G can be grouped into different groups. In FIG. 10, the patches C to D are grouped into a group 5, and the patch G is grouped into a group 6.

In this way, in the case of a group to which three or more patches belong, and where there is no portion where the error ranges of all the patches overlap with one another, subdivision of the group becomes possible by excluding one or more of the patches not to belong to any group. The patch F excluded not to belong to any group is not arrayed in the colorimetric chart 50, or is arrayed in a region other than an information expression region in a case of expressing desired information by patches arrayed in a region (information expression region) of the colorimetric chart 50.

As a method of determining a patch (Lab value) to be excluded, there are two exclusion target determination methods described below, for example.

The first exclusion target determination method is a method of checking positions of patches constituting a group and excluding a path closest to a central position of the group.

Figure 11:
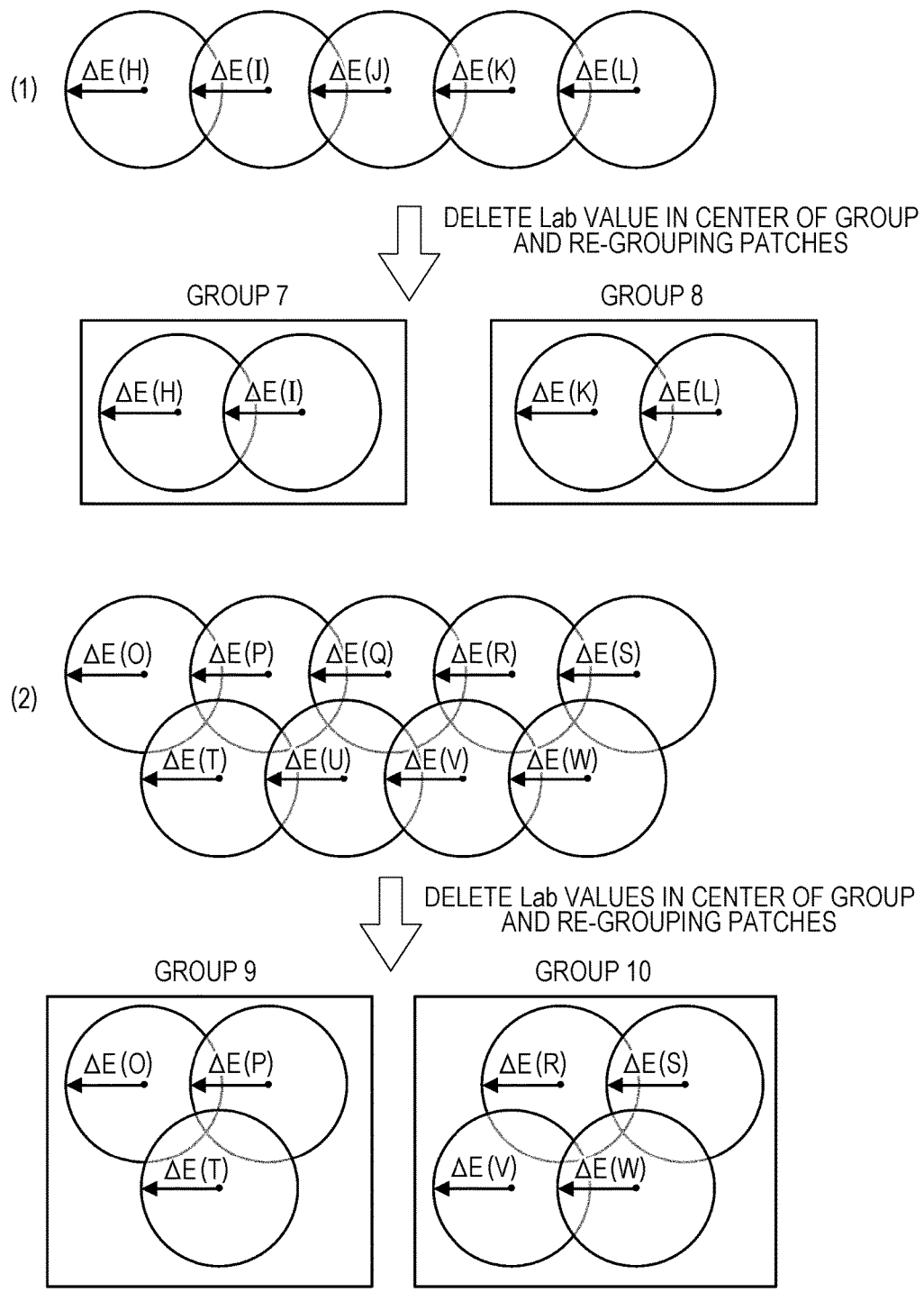
FIG. 11 is a diagram illustrating two examples of excluding a patch (patches) in the center of a group and subdividing the group.

FIG. 11 illustrates an example of a case of excluding a patch determined by the first exclusion target determination method and re-grouping patches. FIG. 11(1) illustrates one group in which the error ranges of five patches (patches H to L) overlap in turn in a linking manner.

In the group of FIG. 11(1), when the patch J closest to the central position of the group is excluded, the patches can be divided into two groups of the patch H and the patch I, and the patch K and the patch L. In FIG. 11(1), the patch H and the patch I are re-grouped into a group 7, and the patch K and the patch L are re-grouped into a group 8.

FIG. 11(2) illustrates one group configured from nine patches (patches O to W). First, in FIG. 11(2), the patch Q closest to the central position of the group is excluded. The group cannot be divided only by the exclusion of the patch Q, and thus a patch closest to the central position in the remaining patch group is excluded again. In FIG. 11(2), both the patch U and the patch V are closest to the center, either one (the patch U in FIG. 11(2)) is excluded.

In FIG. 11(2), after exclusion of the patch Q and the patch U, the patch O, the patch P, and the patch T are re-grouped into a group 9, and the patch R, the patch S, the patch V, and the patch W are re-grouped into a group 10.

In this way, patches closest to the center of the group are excluded in order, and when subdivision becomes possible, re-grouping is performed.

The second exclusion target patch determination method is a method of specifying one patch having a smallest number of overlapping error ranges in the group, and excluding a patch having a largest number of overlapping error ranges with other error ranges in order from among the patches having an error range overlapping with the specified patch until subdivision of the group becomes possible.

Figure 12:
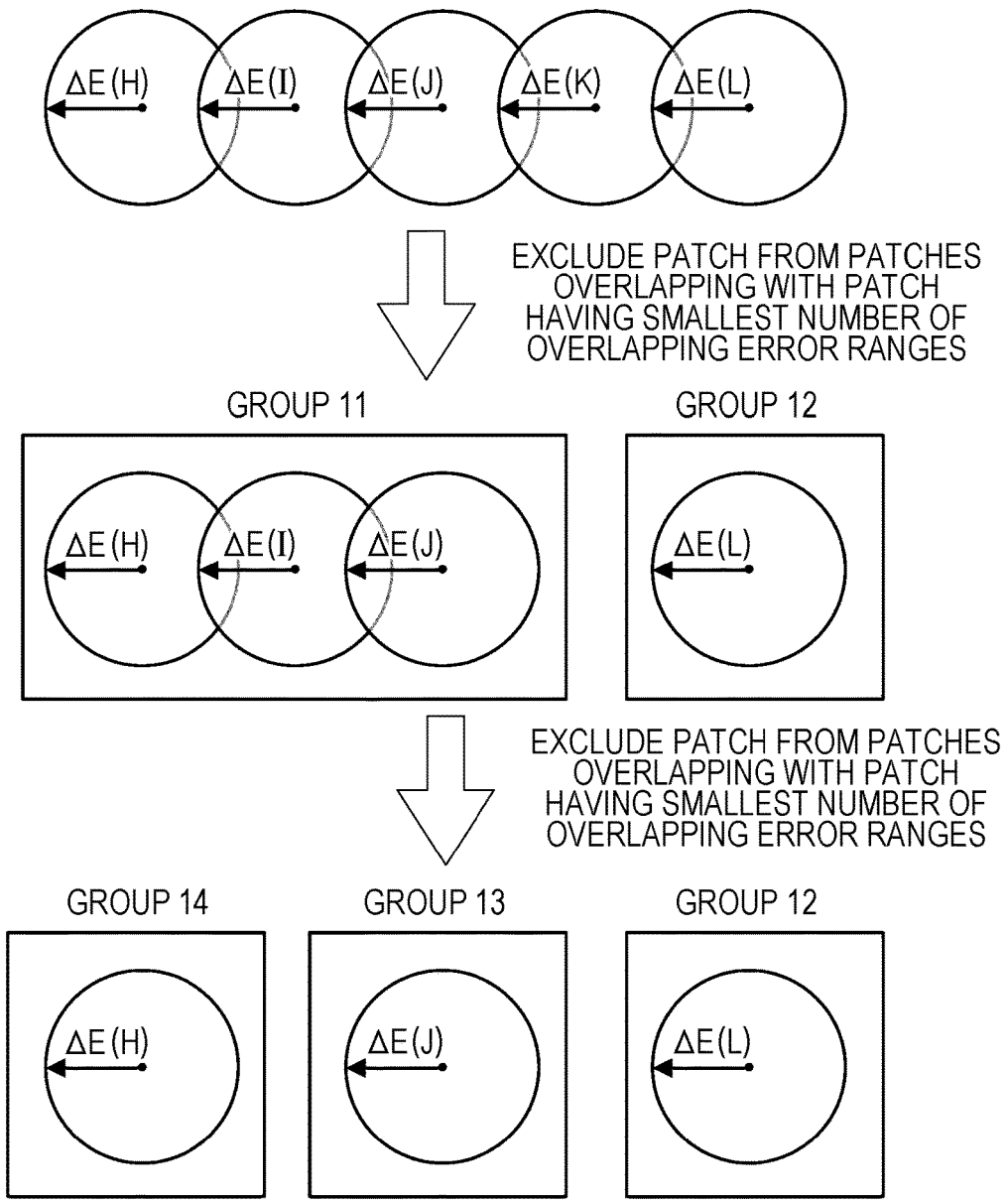
FIG. 12 is a diagram illustrating an example of excluding a patch having a largest number of overlapping error ranges from among patches overlapping with a patch having a smallest number of overlapping error ranges, and subdividing the group.

FIG. 12 illustrates an example of a case of excluding a patch determined by the second exclusion target determination method and re-grouping patches. FIG. 12 illustrates one group in which the error ranges of five patches (patches H to L) overlap with one another in turn in a linking manner.

First, in the group of FIG. 12, a patch having the smallest number of overlapping error ranges is specified. In FIG. 12, both the patch H and the patch L have the smallest number of overlapping error ranges, and thus either one (the patch L in FIG. 12) is selected.

Next, a patch having the largest number of overlapping error ranges with other patches is excluded from among the patches having an error range overlapping with the patch L. In FIG. 12, since only the patch K overlaps with the patch L in the error regions, the patch K is excluded. As a result, the patch H, the patch I, the patch J, and the patch L can be divided into two groups. In FIG. 12, the patch H, the patch I, and the patch J are re-grouped into a group 11, and the patch L is re-grouped into a group 12.

Note that, in FIG. 12, the group 11 is further subdivided. Specifically, a patch having the smallest number of overlapping error ranges in the group 11 is specified. In the group 11, both the patch H and the patch J have the smallest number of overlapping error ranges, and thus either one (the patch J in FIG. 12) is selected.

Next, a patch having the largest number of overlapping error ranges with other patches is excluded from among the patches having an error range overlapping with the patch J. In FIG. 12, only the patch I overlaps with the patch J in the error range, and thus the patch I is excluded. As a result, the patch H and the patch J can be divided into two groups. In FIG. 12, the patch H is re-grouped into a group 14 and the patch J is re-grouped into a group 13.

When the group caused by regrouping can be further subdivided in this manner, the group may be further subdivided.

FIG. 13 illustrates an example of a case of excluding patches, where there is a plurality of the patches determined by the second exclusion target determination method, and re-grouping patches.

FIG. 13 illustrates one group configured from nine patches (patches O to W). First, in FIG. 13, a patch having the smallest number of overlapping error ranges is specified. In FIG. 13, both the patch O and the patch S have the smallest number of overlapping error ranges, and thus either one (the patch S in FIG. 13) is selected.

Next, a patch having the largest number of overlapping error ranges with other patches is excluded from among the patch R and the patch W having an error range overlapping with the patch S. In FIG. 13, the number of overlapping error ranges with other patches is five in the patch R and three in the patch W, and thus the patch R is excluded.

After the exclusion of the patch R, whether subdivision of the group is possible is determined. After the exclusion of the patch R, subdivision of the group is not possible, and thus the patch W having the next largest number of overlapping error ranges with other patches after the patch R is further excluded.

As a result, the patch S, and the remaining other patches can be divided into two groups. In FIG. 13, the patches (O to Q and T to V) are re-grouped into a group 15, and the patch S is re-grouped into a group 16.

When there is a plurality of patches having an error range overlapping with the patch having the smallest number of overlapping error ranges, the patch having the largest number of overlapping error ranges with other patches is excluded in order from among the plurality of patches until subdivision of the group becomes possible.

Note that, in FIG. 13, the group 15 is further subdivided. Specifically, a patch having the smallest number of overlapping error ranges in the group 15 is specified. In the group 15, both the patch O and the patch V have the smallest number of overlapping error ranges, and thus either one (the patch O in FIG. 13) is selected.

Next, a patch having the largest number of overlapping error ranges with other patches is excluded from among the patch P and the patch T having an error range overlapping with the patch O. In FIG. 13, the number of overlapping error ranges with other patches is five in the patch P and three in the patch T, and thus the patch P is excluded.

After the exclusion of the patch P, whether subdivision of the group is possible is determined. After the exclusion of the patch P, subdivision of the group is not possible, and thus the patch T having the next largest number of overlapping error ranges with other patches after the patch P is further excluded. As a result, the patch O, and the other patches can be divided into two groups. In FIG. 13, the patch O is re-grouped into a group 18, and the patches (Q, U, and V) are re-grouped into a group 17.

Note that examples of the method of determining a patch to be excluded are not limited to the above-described first and second exclusion target determination methods.

Next, a case of adding a new group by addition of a patch will be described. FIG. 14 illustrates the positions of the patches A to E on the Lab color space 100. The patch A is grouped into the group 1, the patch B is grouped into the group 2, and the patches C to E are grouped into a group 3. The groups 1 to 3 cannot be further subdivided.

Therefore, the PC terminal 40 adds a new patch having an error range not overlapping with all the patches belonging to the groups 1 to 3, and groups the new patch into a new group. In FIG. 14, a patch F having an error range not overlapping with all the patches A to E is added, and the patch F is grouped into a group 4.

In the embodiment of the present invention, as a method of determining a patch (Lab value) to be added, a method of randomly determining a patch (Lab value) to be added in a quadrant in which the number of existing groups is smallest, in a case where the Lab color space 100 is divided into four quadrants, is adopted. In a case where there is a plurality of quadrants having the smallest number of groups, one quadrant is randomly selected from them. A patch to be added may be determined by another method.

Next, regarding the reproducibility confirming system 7, a flow of a case where the PC terminal 40 confirms color reproducibility of an image printed by the image forming device 10 will be described.

Figure 15:
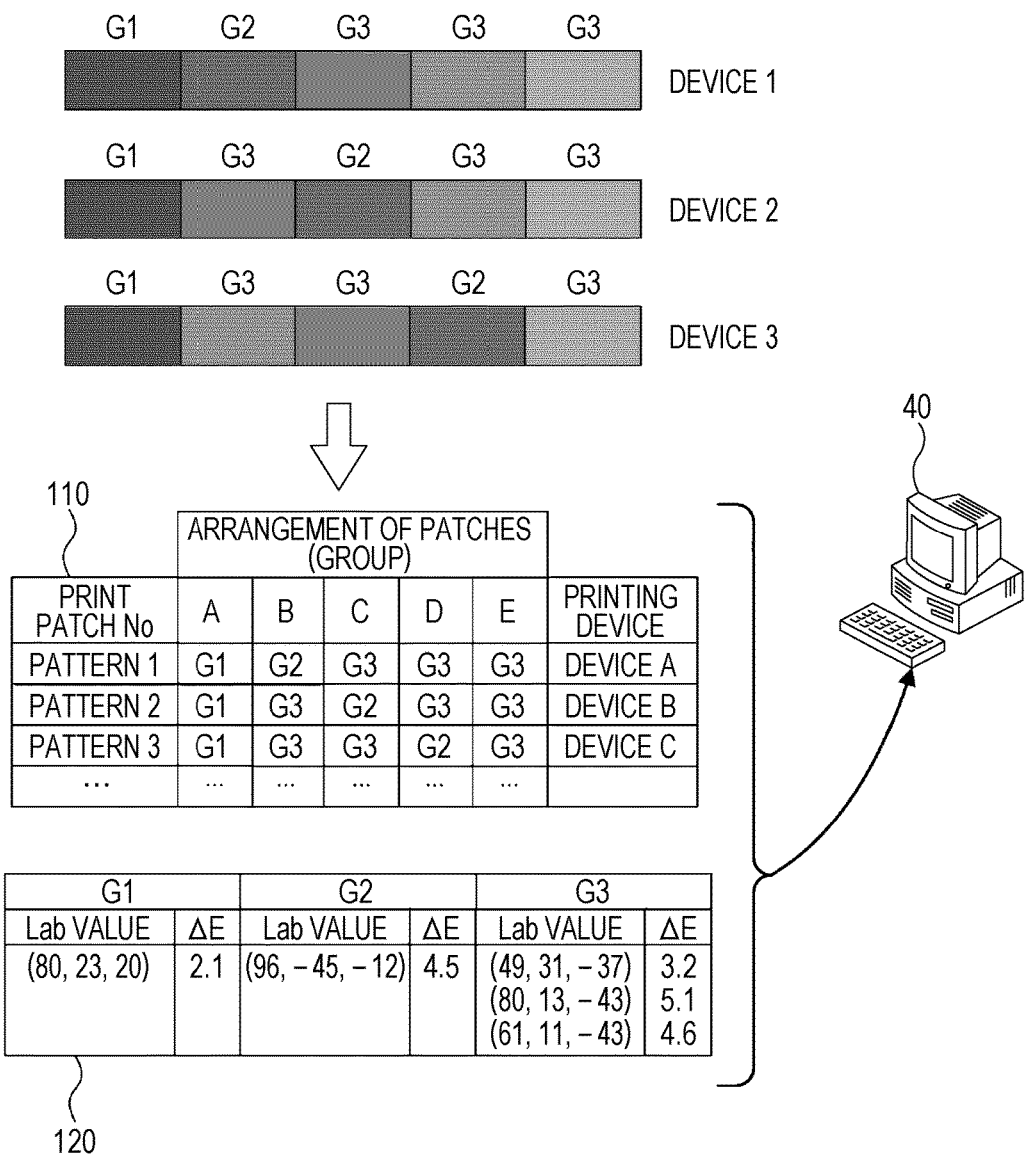
FIG. 15 is a diagram illustrating a state in which a PC terminal stores device information indicated by an arrangement order of groups and information of patches constituting the groups.

First, the PC terminal 40 performs the above-described grouping, and stores the arrangement orders of groups, the information expressed by the arrangement orders, and the patches (Lab values) belonging to the groups. FIG. 15 illustrates a state in which the PC terminal 40 stores the arrangement orders of groups, the information expressed by the arrangement orders, and the patches (Lab values) belonging to the groups in tables.

In FIG. 15, a table 110 in which a plurality of image forming devices 10 (devices A to C in FIG. 15) is associated and registered for each arrangement order of groups, and a table 120 in which the patches (Lab values) belonging to the groups, and the radii (ΔE) of the error ranges of the patches are registered.

Figure 16:
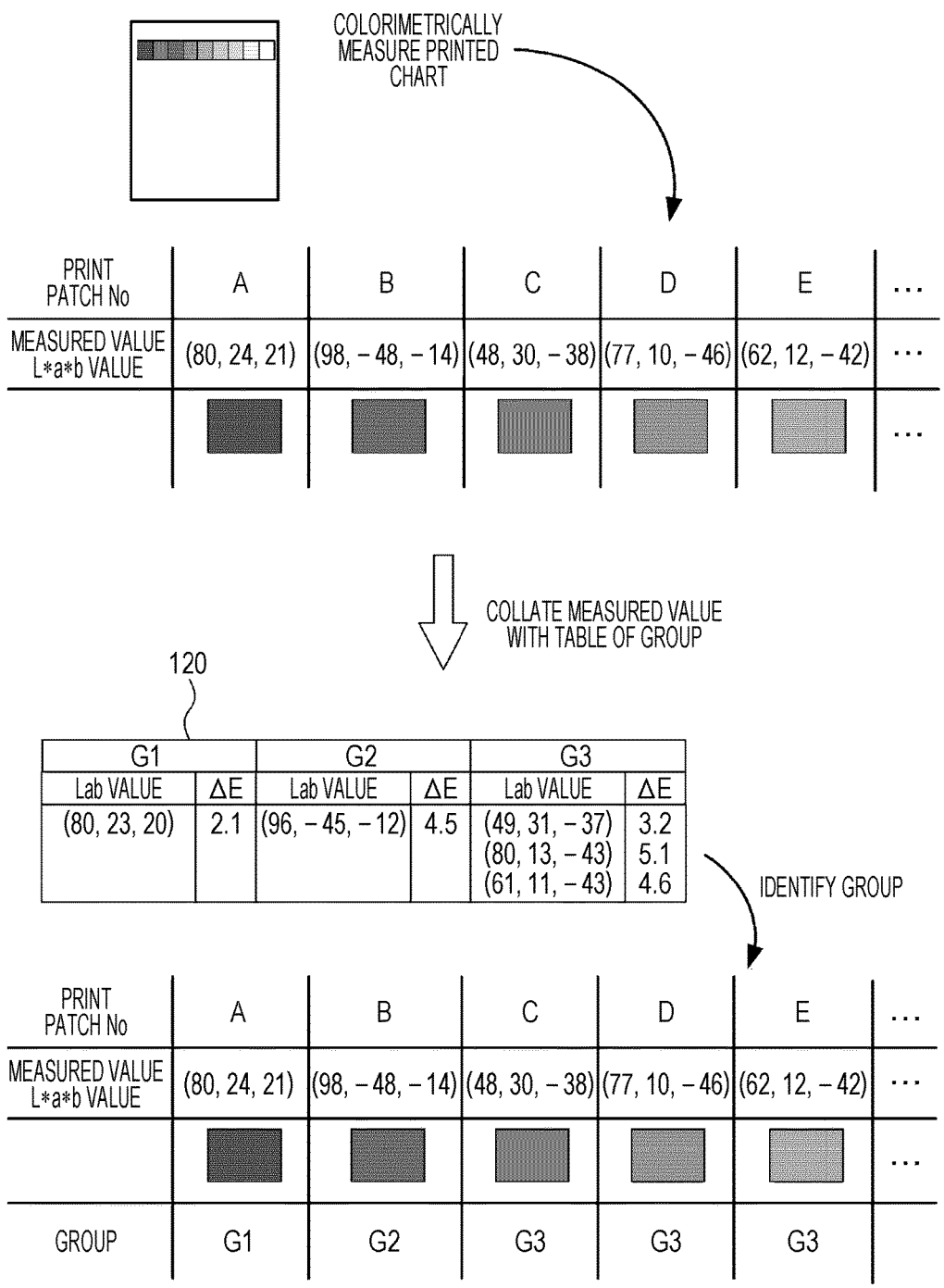
FIG. 16 is a diagram illustrating a state of identifying an arrangement order of groups to which patches belong from measured values obtained through colorimetry.

Next, the PC terminal 40 causes the image forming device 10 to print the colorimetric chart 50. The colorimeter 70 colorimetrically measures the printed colorimetric chart 50 and transmits measured values obtained through the colorimetry to the PC terminal 40. The PC terminal 40 compares the measured values obtained from the colorimeter 70 with the table 120 of FIG. 15 and identifies the arrangement orders of the groups. FIG. 16 illustrates a state in which the PC terminal 40 identifies the arrangement order of a group.

Next, the PC terminal 40 collates the identified arrangement order of the group with the table 110 in FIG. 15, and recognizes the information indicated by the arrangement order of the group (an identifier of the image forming device 10 (which of the devices A to C) in FIG. 15). FIG. 17 illustrates a state in which the PC terminal 40 recognizes the information indicated by the arrangement order of the group.

The PC terminal 40 recognizes which image forming device 10 has printed the colorimetric chart 50 colorimetrically measured by the colorimeter 70. Note that the PC terminal 40 accumulates the measured values obtained through the colorimetry of the colorimetric chart 50, which have been acquired from the colorimeter 70, as a colorimetric history in the hard disk device 15, and determines the value of ΔE indicating the error range of each path on the basis of the colorimetric history when next time performing grouping.

Next, processing performed in the reproducibility confirming system 7 will be described on the basis of the flow illustrated in FIGS. 18 to 24.

Figure 18:
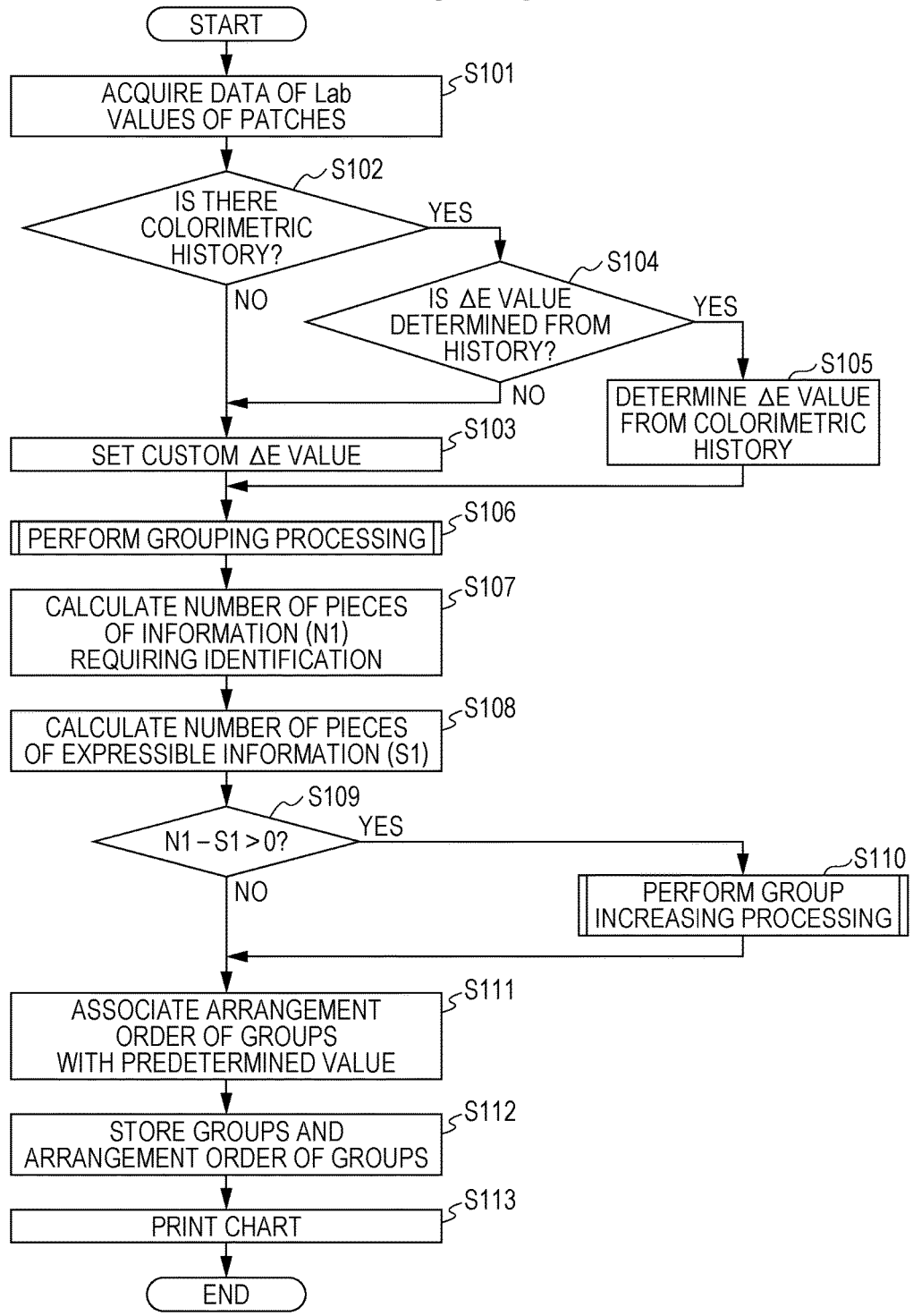
FIG. 18 is a flowchart illustrating processing performed by a PC terminal until outputting a colorimetric chart.

FIG. 18 illustrates a flow of processing performed by the PC terminal 40 until causing the image forming device 10 to print the colorimetric chart 50.

First, the PC terminal 40 acquires data of the Lab values of the patches constituting the colorimetric chart 50 (step S101). In a case where the data of the measured values of when the printed colorimetric chart 50 was colorimetrically measured in the past remains as the colorimetric history (Yes in step S102), the PC terminal 40 receives selection as to whether determining the values of ΔE of the patches using the colorimetric history (step S104).

When receiving the selection to determine ΔE using the colorimetry history (Yes in step S104), the PC terminal 40 determines the values of ΔE of the patches on the basis of the colorimetric history (step S105), and proceeds to step S106.

When receiving selection not to use the colorimetric history (No in step S104) or when there is no colorimetric history itself (No in step S102), the PC terminal 40 receives the values of ΔE of the patches from the user (step S103), and then executes processing of grouping the patches (step S106).

When grouping is completed, the PC terminal 40 calculates the number (N1) of pieces of information requiring expression by the arrangement order of groups (step S107). For example, when the number of image forming devices 10 connected to the same network as its own device is seven, the PC terminal 40 determines that seven arrangement orders are required for identifying the image forming devices 10.

Next, after calculating the number (S1) of pieces of information expressible by the number of groups caused by the grouping in step S106 (step S108), the PC terminal 40 checks whether "N1−S1>0" is established (step S109).

If the expression is established (Yes in step S109), the PC terminal 40 performs the processing of increasing the number of groups (step S110), and proceeds to step S111. In the case where the expression is not established (No in step S109), the PC terminal 40 associates predetermined information to be expressed such as a device that performs printing with the arrangement order of the groups (step S111) and stores the information together with the patches belonging to the groups (step S112).

After that, the PC terminal 40 creates the print data of the colorimetric chart 50 such that the arrangement order of the groups indicates the information to be expressed, transmits the print data to the image forming device 10 to print the colorimetric chart 50 (step S113), and terminates the present processing.

Figure 19:
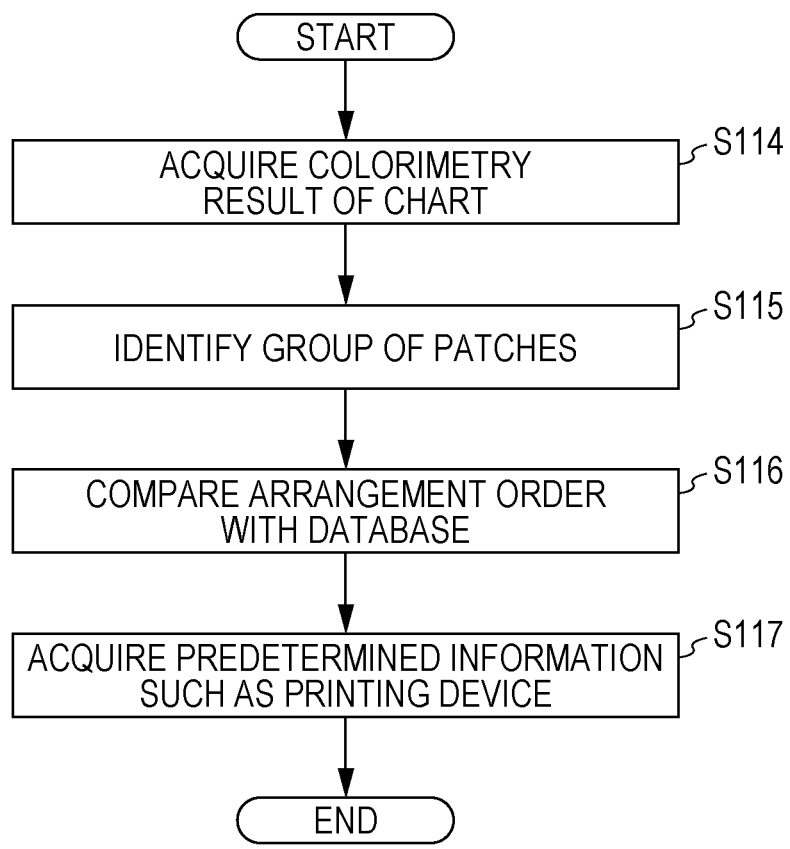
FIG. 19 is a flowchart illustrating processing performed by a PC terminal that has received measured values obtained through colorimetry.

FIG. 19 is a flowchart illustrating processing performed by the PC terminal 40 that has received the measured values obtained through colorimetry. First, the PC terminal 40 receives the colorimetry result from the colorimeter 70 that has colorimetrically measured the colorimetric chart 50 printed by the image forming device 10 (step S114).

Regarding the Lab values indicated by the patches in the colorimetry result, the PC terminal 40 identifies the groups to which the patches belong by reference to the table 120 in FIG. 15 (step S115). After that, the PC terminal 40 collates the arrangement order of the groups with the content stored in step S112 of FIG. 18 (step S116), acquires the predetermined information indicated by the arrangement order of the groups (step S117), and terminates the present process.

Figure 20:
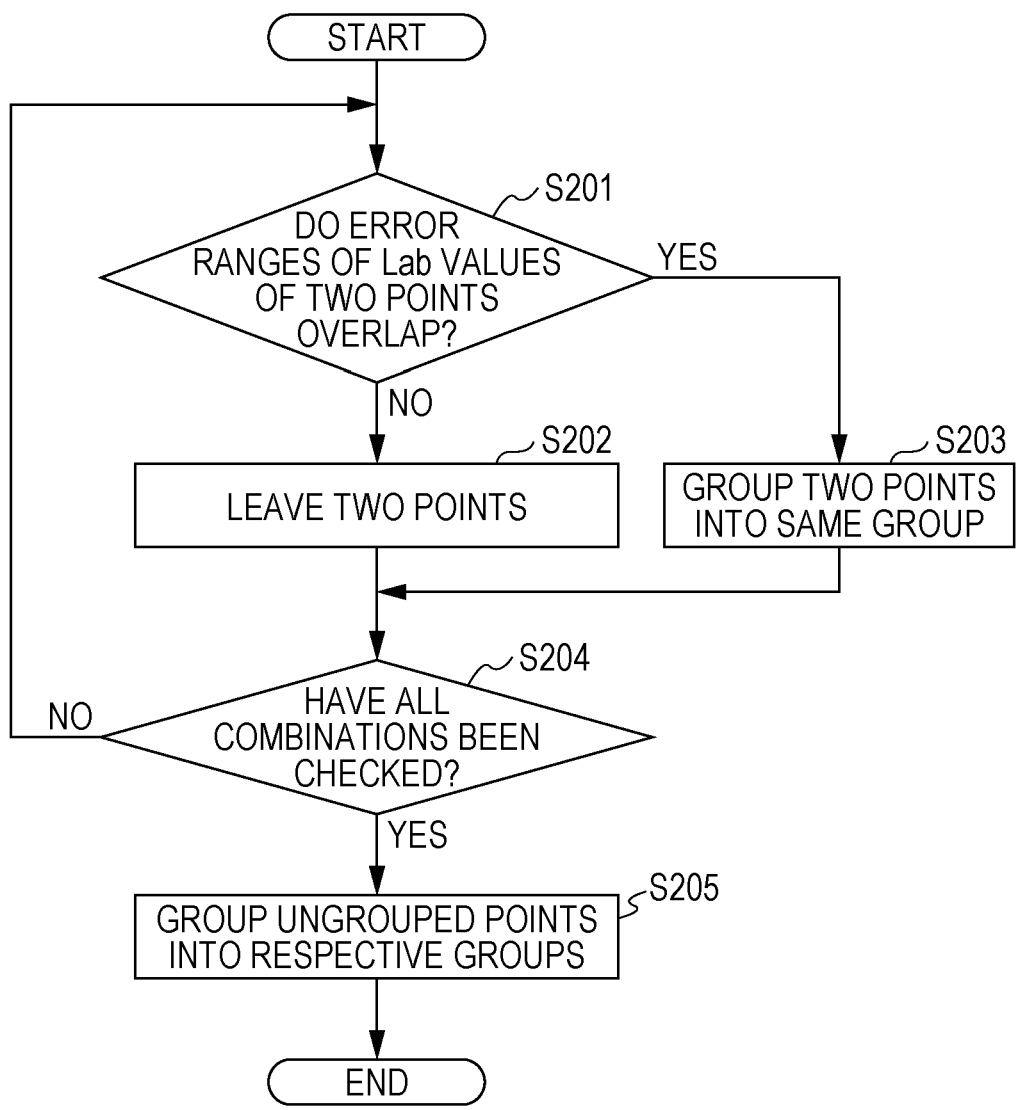
FIG. 20 is a flowchart illustrating processing of grouping patches.

FIG. 20 illustrates a flow of the grouping processing performed in step S106 of FIG. 18. First, the PC terminal 40 selects a combination of arbitrary two patches from the patches (Lab values) to be used for the colorimetric chart 50, and checks whether the error ranges of the two patches overlap by the method described in FIGS. 6 and 7 (step S201).

When determining that the two patches overlap (Yes in step S201), the PC terminal 40 groups the two patches to belong to the same group (step S203), and proceeds to step S204.

When the two patches do not overlap (No in step S201), the PC terminal 40 leaves the two patches (step S202), and proceeds to step S204.

In step S204, the PC terminal 40 checks whether the error ranges overlap has been checked for all of combinations of two patches (step S204).

When whether the error ranges overlap has not been checked for all the combinations of two patches (No in step S204), the PC terminal 40 returns to step S201 and continues the processing.

Note that the PC terminal 40 selects an unchecked combination in step S201 when returning from step S204 to step S201.

When whether the error ranges overlap has been checked for all the combinations of two patches (Yes in step S204), and when there are ungrouped patches (patches having an error range not overlapping with other patches) at the point of time, the PC terminal 40 respectively groups the patches into independent groups (step S205), and terminates the processing.

Figure 21:
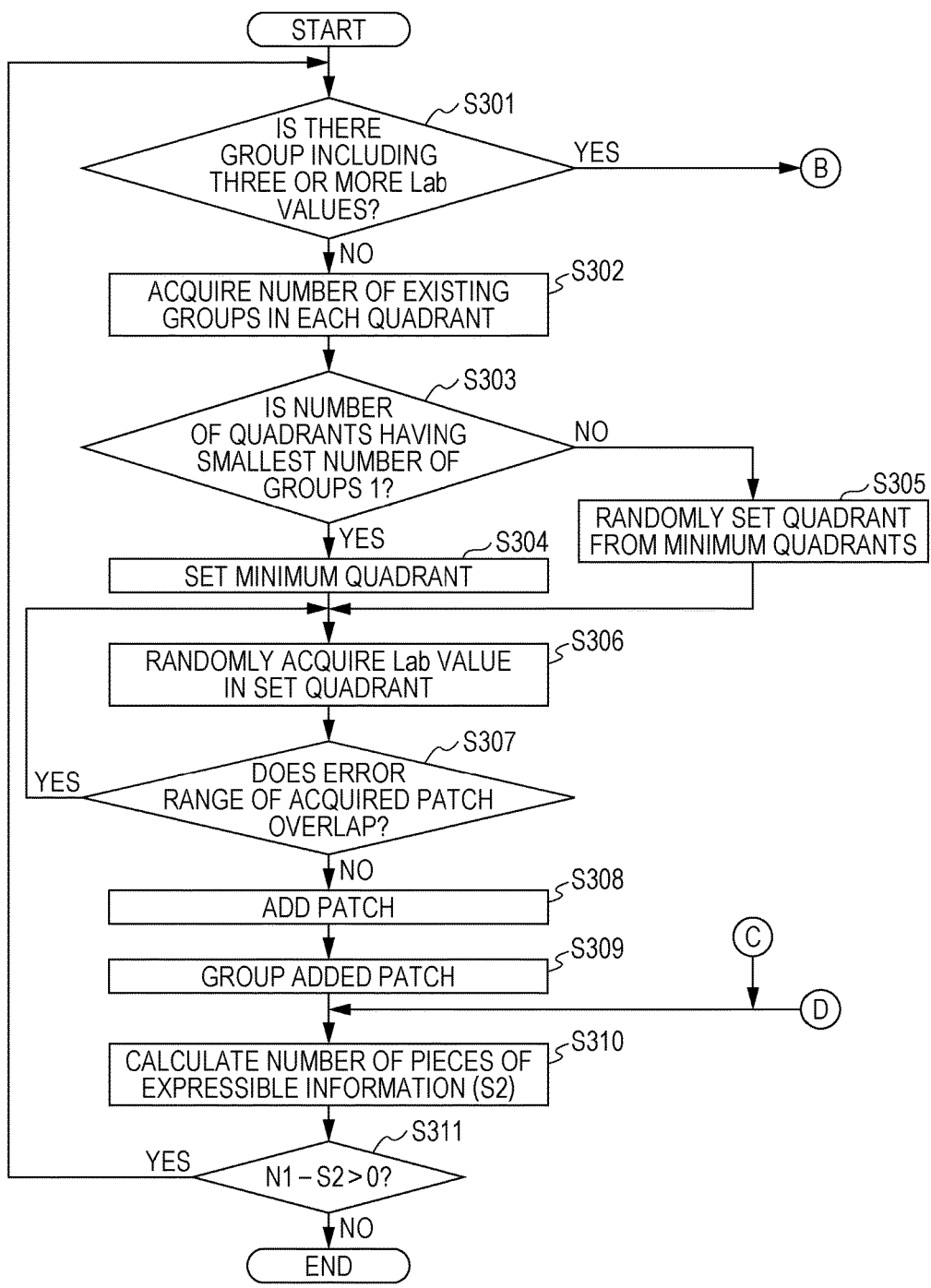
FIG. 21 is a flowchart illustrating processing of increasing the number of groups.

FIG. 21 illustrates a flow of processing of increasing a group performed in step S110 of FIG. 18.

First, the PC terminal 40 checks whether there is a group to which three or more patches belong (step S301). When there is no group to which three or more patches belong (No in step S301), the PC terminal 40 divides the Lab color space 100 into four quadrants and calculates the number of groups included in each of the quadrants (step S302).

In a case where there is one quadrant including the smallest number of groups (Yes in step S303), the PC terminal 40 sets the quadrant as a quadrant to which a new patch is added (step S304), and proceeds to step S306.

In a case where there are two or more quadrants including the smallest number of groups (No in step S303), the PC terminal 40 sets a quadrant randomly selected from the quadrants as the quadrant to which a new patch is added (step S305), and proceeds to step S306.

In step S306, the PC terminal 40 randomly acquires one patch (Lab value) within the quadrant set immediately before. When the error range of the acquired patch overlaps with the error range of another patch (Yes in step S307), the PC terminal 40 returns to step S306 and acquires one patch again.

When the error range of the acquired patch does no overlap with the error range of another patch (No in step S307), the PC terminal 40 adds the patch to the patches (information expression patches) to be printed as the colorimetric chart 50 (step S308), and groups the patch into a new group (step S309).

After that, similarly to step S108 in FIG. 18, the PC terminal 40 calculates the number (S2) of pieces of information expressible by the number of current groups (step S310), and checks whether "N1−S2>0" is established (step S311).

When the expression is established (Yes in step S311), the PC terminal 40 returns to step S301 and continues the processing. When the expression is not established (No in step S311), the PC terminal 40 terminates the processing.

Figure 22:
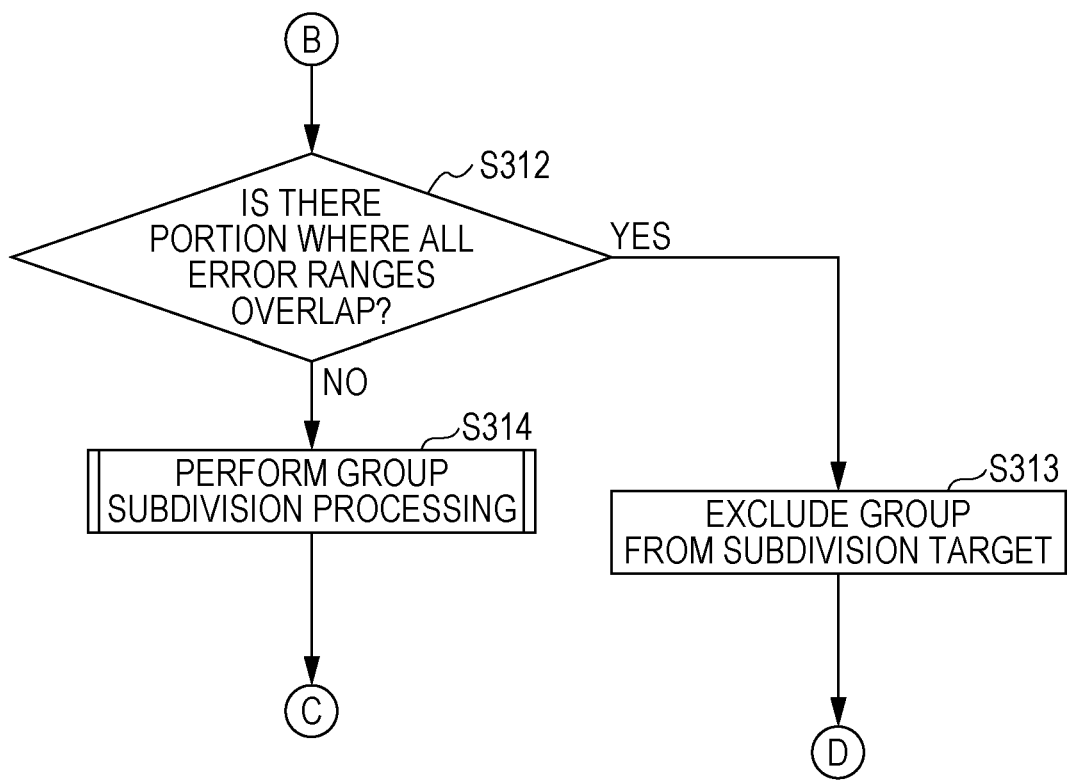
FIG. 22 is a flowchart followed by the processing in FIG. 21 and for determining whether processing of subdividing a group is performed.

When there is a group to which three or more patches belong (Yes in step S301), the PC terminal 40 proceeds to step S312 in FIG. 22.

In step S312 of FIG. 22, the PC terminal 40 checks whether the error ranges of all the patches have an overlapping portion in the group to which three or more patches belong, which has been found in step S301 in FIG. 21.

When the error ranges of all the patches have an overlapping portion (Yes in step S312), the PC terminal 40 determines that subdivision of the group is not possible and excludes the group from the target for subdivision (step S313), and returns to step S310 in FIG. 21 and continues the processing. The group excluded from the target for subdivision is set not to be recognized as a group to which three or more patches belong thereafter in step S301 in FIG. 21.

When the error ranges of all the patches have no overlapping portion (No in step S312), the PC terminal 40 determines that subdivision of the group is possible and performs processing of subdividing the group (step S314), and returns to step S310 in FIG. 21 and continues the processing.

There are two types of processing of subdividing a group performed in step S314 in FIG. 22, and one of them is adopted. One of the processing is processing of subdividing a group by the method of excluding a patch in the center of group, which has been described in FIG. 11, and the other of the processing is processing of subdividing a group by the method of excluding a patch having an error range overlapping with the error range having the smallest number of overlapping error ranges, which has been described in FIGS. 12 and 13.

Figure 23:
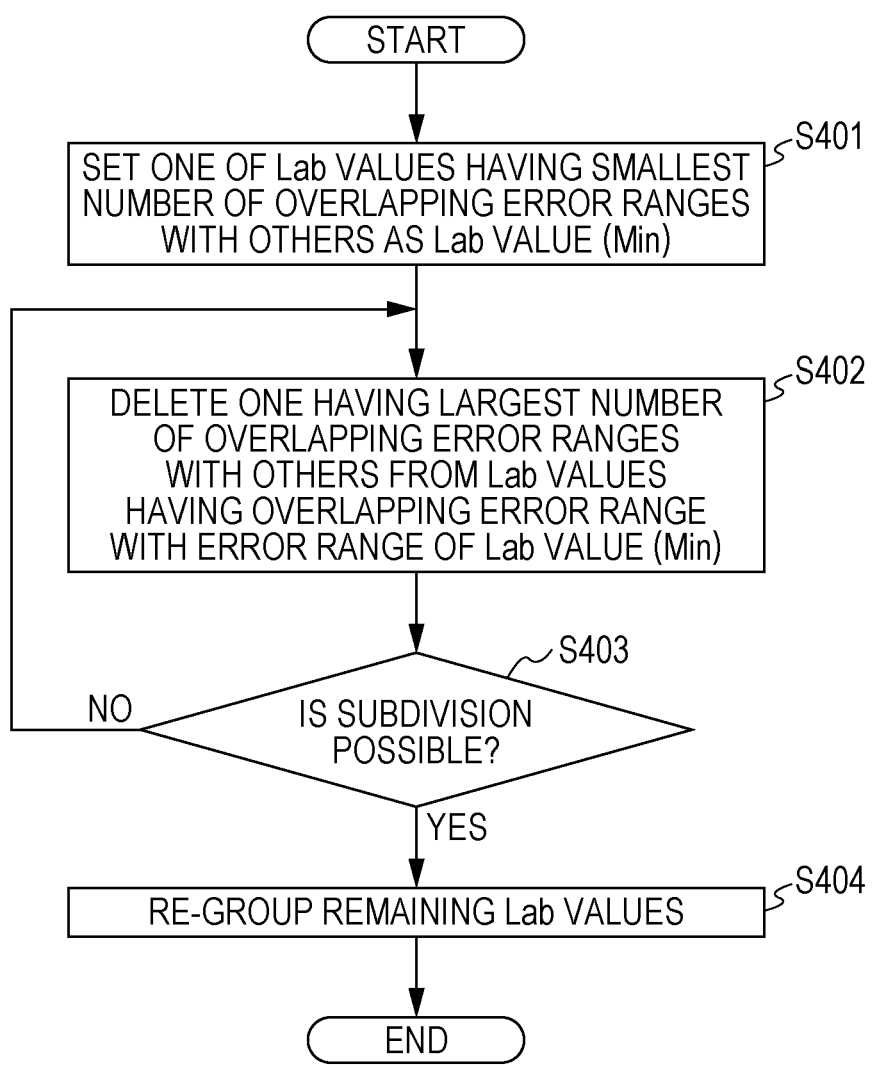
FIG. 23 is a flowchart illustrating processing of excluding a patch having the largest number of overlapping error ranges from among patches overlapping with a patch having the smallest number of overlapping error ranges, and subdividing the group.

FIG. 23 illustrates a flow of processing of subdividing a group by the method described in FIG. 11. First, one patch having the smallest number of error ranges is specified in the patches constituting the group to which three or more patches belong, which has been found in step S301 in FIG. 21, and the one patch is set as an Lab value (Min) (Step S401).

When there is a plurality of patches having the smallest number of overlapping error ranges, one patch is selected from the patches and is set as the Lab value (Min).

After that, a patch having the largest number of overlapping ranges with other patches among the patches (Lab values) having an error range overlapping with the patch set as the Lab value (Min) is excluded from the group such that the excluded patch do not belong to any group (step S402). Note that, in steps S111 to S113 in FIG. 18, the patch excluded not to belong to any group is arrayed in a region other than the information expression region, and the colorimetric chart 50 is created.

When subdivision of the group into two is not possible (No in step S403), the processing returns to step S402 and continues. When subdivision of the group into two is possible (Yes in step S403), re-grouping is performed with the remaining patches (step S404), and the present processing is terminated.

Figure 24:
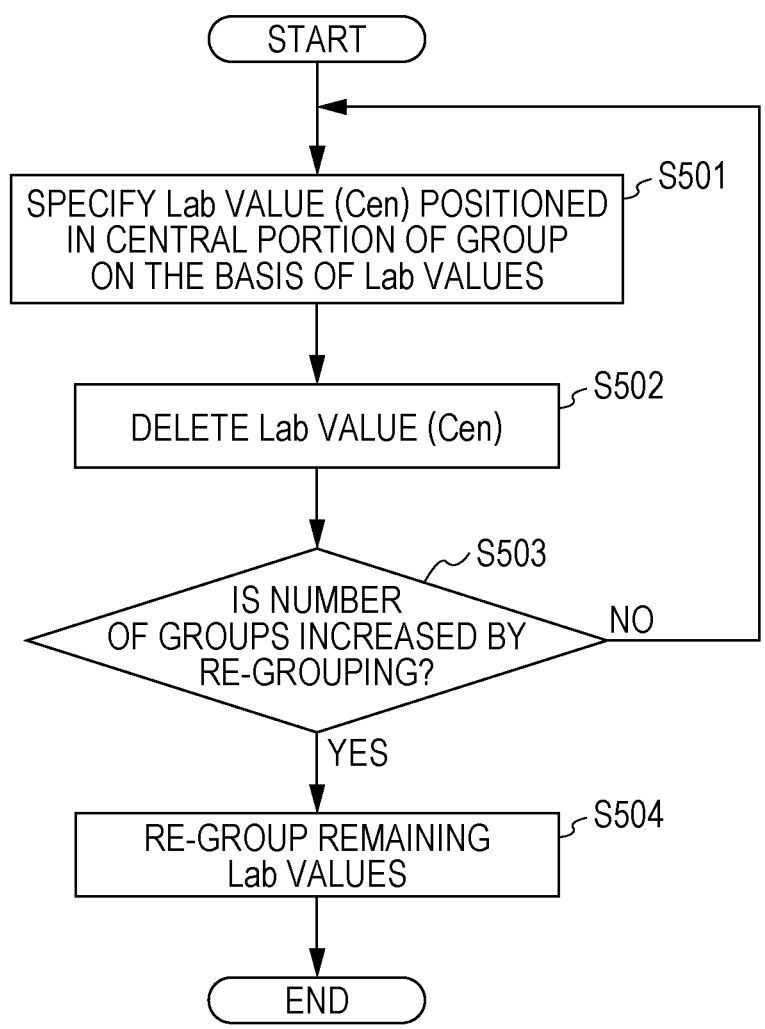
FIG. 24 is a flowchart illustrating processing of excluding a patch in the center of a group, and increasing the number of groups.
Figure 25:
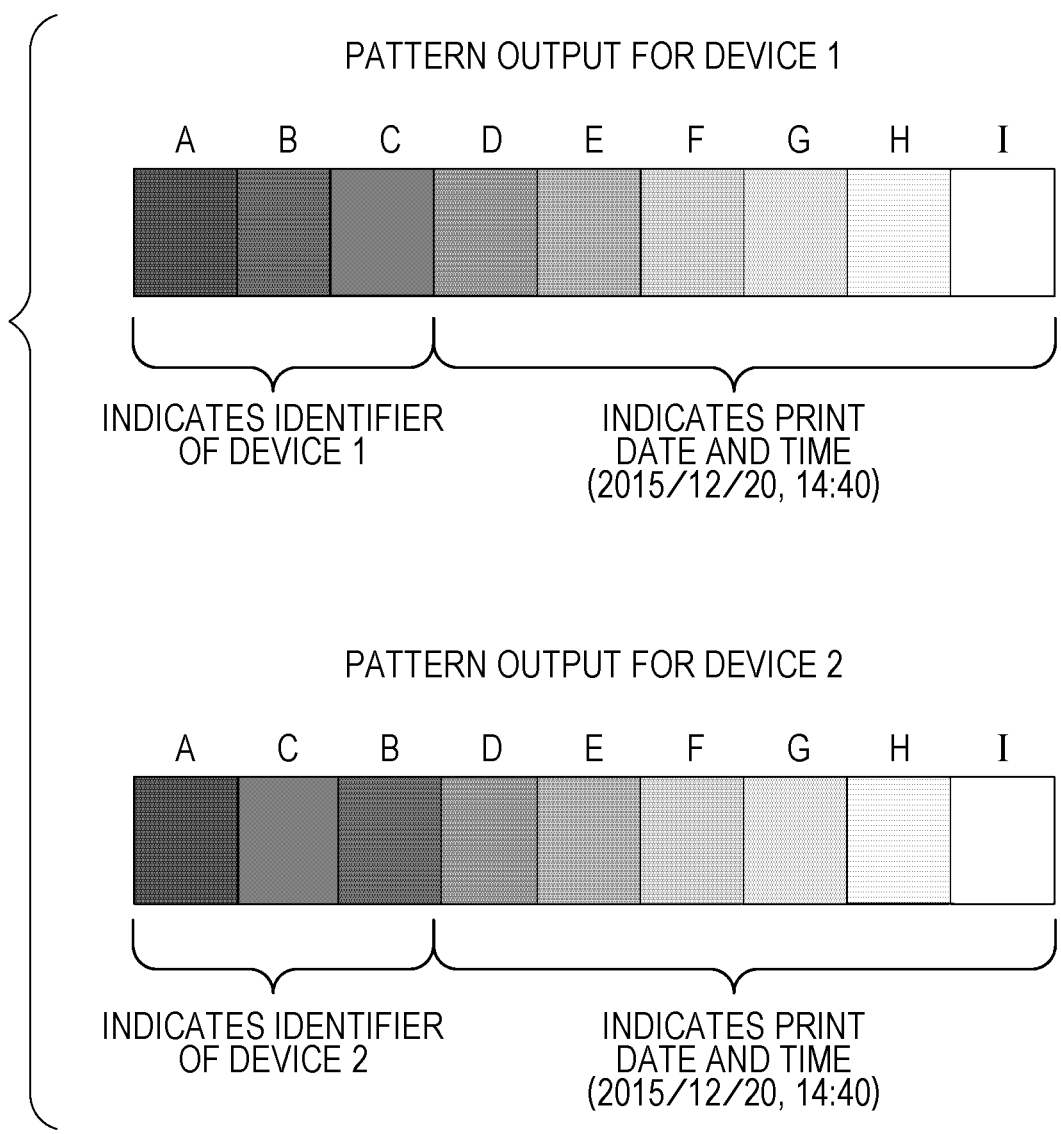
FIG. 25 is a diagram illustrating an example of an arrangement order of patches indicating information of a device that has performed printing and print date and time.
Figure 26:
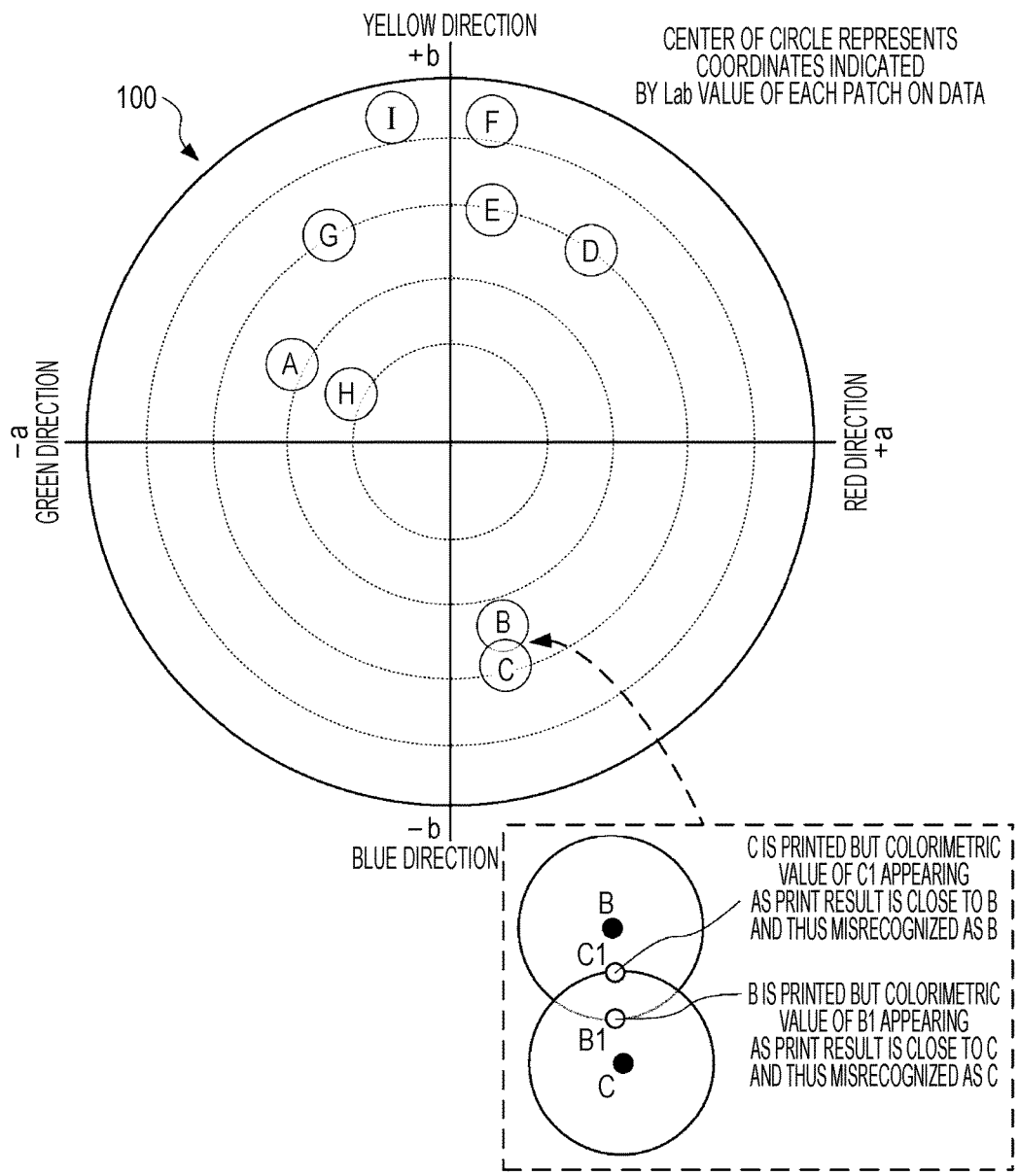
FIG. 26 is a diagram illustrating an example of a case where there are patches having an overlapping error range due to color deviation on an Lab color space.

FIG. 24 illustrates a flow of processing of subdividing a group by the method described in FIGS. 12 and 13. First, when the positions on the Lab color space 100 of the patches constituting the group to which three or more patches belong, which has been found in step S301 in FIG. 21, are grasped, a patch closest to a central portion of the group is specified as an Lab value (Cen) (step S501).

Next, when the patch specified as the Lab value (Cen) is excluded, whether the number of groups is increased if the remaining patches are re-grouped is checked (step S503).

When the number of groups is not increased (No in step S503), the processing returns to step S501 and continues. When the processing returns to step S501, a patch closest to the central portion of the group configured by the remaining patches is specified again as the Lab value (Cen).

When the number of groups is increase (Yes in step S503), the remaining patches are re-grouped (step S504), and the processing is terminated.

As described above, in the present invention, the patches constituting the colorimetric chart 50 are grouped such that patches having an overlapping possible error range of color deviation (color deviation) belong to the same group, and the arrangement order of the patches is determined such that the arrangement order of the belonging groups expresses desired information such as the device that performs printing, the print date and time, and the like. Then, the colorimetric chart 50 in which the patches are arranged in the determined arrangement order is created.

When determining the information embedded in the colorimetric chart 50 from the measured values obtained by reading the colorimetric chart 50, the arrangement order of the groups to which the patches belong is recognized, and the information of the image forming device 10 that has printed the colorimetric chart 50, the print date and time, and the like is specified. As a result, even when a patch is misrecognized due to color deviation, the group to which the patch belongs is not misrecognized. Therefore, the information expressed by the arrangement order of the patches can be accurately specified.

Although the embodiment of the present invention have been described with reference to the drawings, specific configurations are not limited to those described in the embodiments, and changes and additions without departing from the gist of the present invention are included in the present invention.

In the embodiment of the present invention, the colorimeter 70, the image forming device 10, and the PC terminal 40 are separate devices. However, two or more types may be combined into an integrated device.

In the embodiment of the present invention, the error range is a sphere. However, the error range may be a range of a shape other than a sphere. Further, in the embodiment of the present invention, the error range can be set by the user. However, the error range may be a predetermined range, for example, the value of ΔE may be a fixed value.

Although embodiments of the present invention have been described and illustrated in detail, the disclosed embodiments are made for purposes of illustration and example only and not limitation. The scope of the present invention should be interpreted by terms of the appended claims.

What is claimed is:

1. A colorimetric chart creating apparatus comprising a hardware processor that:

groups a plurality of patches having different colors and to be arrayed in a colorimetric chart such that patches having respective overlapping error ranges of color reproducibility which overlap with one another belong to a same group;

determines an arrangement order of the plurality of patches such that an arrangement order of the groups expresses desired information; and creates print data of the colorimetric chart in which the plurality of patches is arrayed in the determined arrangement order.

2. The colorimetric chart creating apparatus according to claim 1, wherein
the error ranges are settable by a user.

3. The colorimetric chart creating apparatus according to claim 1, wherein
the hardware processor sets the error ranges on the basis of colorimetric data obtained by measuring the colorimetric chart with a colorimeter.

4. The colorimetric chart creating apparatus according to claim 1, wherein
the hardware processor
excludes a part of patches from one group to which three or more patches belong such that the excluded patch does not belong to any of the groups, and subdivides the one group into a plurality of groups, and
determines the arrangement order such that the excluded patch is not included in an information expression region on the colorimetric chart for expressing the desired information.

5. The colorimetric chart creating apparatus according to claim 1, wherein
the hardware processor adds a new patch having an error range not overlapping with all of the other patches to the plurality of patches to be arrayed in the colorimetric chart, and adds a group to which the new patch belongs to the group.

6. The colorimetric chart creating apparatus according to claim 1, wherein the hardware processor determines whether the patches have respective overlapping error ranges of color reproducibility which overlap with one another by comparing a distance between the patches to a sum of the respective overlapping error ranges.

7. A colorimetric chart creating method comprising:
grouping a plurality of patches having different colors and to be arrayed in a colorimetric chart such that patches having respective overlapping error ranges of color reproducibility which overlap with one another belong to a same group;

determining an arrangement order of the plurality of patches such that an arrangement order of the groups expresses desired information; and creating print data of the colorimetric chart in which the plurality of patches is arrayed in the determined arrangement order.

8. The colorimetric chart creating method according to claim 7, wherein
the error ranges are settable by a user.

9. The colorimetric chart creating method according to claim 7, further comprising:
setting the error ranges on the basis of colorimetric data obtained by measuring the colorimetric chart with a colorimeter.

10. The colorimetric chart creating method according to claim 7, wherein
the grouping includes excluding a part of patches from one group to which three or more patches belong such that the excluded patch does not belong to any of the groups, and subdividing the one group into a plurality of groups, and
the determining includes determining the arrangement order such that the excluded patch is not included in an information expression region on the colorimetric chart for expressing the desired information.

11. The colorimetric chart creating method according to claim 7, wherein
the grouping includes adding a new patch having an error range not overlapping with all of the other patches to the plurality of patches to be arrayed in the colorimetric chart, and adding a group to which the new patch belongs to the group.

12. A non-transitory recording medium storing a computer readable program for causing an information processing device to execute the colorimetric chart creating method according to claim 7.

13. The colorimetric chart creating method according to claim 7, including determining whether the patches have respective overlapping error ranges of color reproducibility which overlap with one another by comparing a distance between the patches to a sum of the respective overlapping error ranges.

* * * * *